United States Patent
Ithal et al.

(10) Patent No.: US 11,695,785 B2
(45) Date of Patent: Jul. 4, 2023

(54) CLOUD ENVIRONMENT ANALYTICS USING SNAPSHOTTING

(71) Applicant: Normalyze, Inc., Los Altos, CA (US)

(72) Inventors: Ravishankar Ganesh Ithal, Los Altos, CA (US); Yang Zhang, Fremont, CA (US)

(73) Assignee: Normalyze, Inc., Los Altos, CA (US)

( * ) Notice: Subject to any disclaimer, the term of this patent is extended or adjusted under 35 U.S.C. 154(b) by 0 days.

(21) Appl. No.: 17/939,501

(22) Filed: Sep. 7, 2022

(65) Prior Publication Data
US 2023/0087093 A1    Mar. 23, 2023

Related U.S. Application Data

(60) Provisional application No. 63/246,303, filed on Sep. 20, 2021, provisional application No. 63/246,310, filed on Sep. 21, 2021, provisional application No. 63/246,313, filed on Sep. 21, 2021, provisional application No. 63/246,315, filed on Sep. 21, 2021.

(51) Int. Cl.
*H04L 9/06* (2006.01)
*H04L 9/40* (2022.01)

(52) U.S. Cl.
CPC .................. *H04L 63/083* (2013.01)

(58) Field of Classification Search
CPC .......................................... H04L 63/083
USPC .................................................. 726/7
See application file for complete search history.

(56) References Cited

U.S. PATENT DOCUMENTS

| | | | |
|---|---|---|---|
| 8,190,850 B1 * | 5/2012 | Davenport | G06F 16/10 |
| | | | 711/170 |
| 8,392,997 B2 | 3/2013 | Chen | |
| 8,402,514 B1 | 3/2013 | Thompson | |

(Continued)

FOREIGN PATENT DOCUMENTS

WO    2017049439 A1    3/2017

OTHER PUBLICATIONS

Security and Privacy Implications on Database Systems in Big Data Era: A Survey, Samaraweera et al, Jul. 2019 (Year: 2019).*

(Continued)

*Primary Examiner* — Jahangir Kabir
(74) *Attorney, Agent, or Firm* — Flagship Patents; Sikander Khan; Christopher Volkmann

(57) ABSTRACT

The technology disclosed relates to streamlined analysis of security posture of a cloud environment. In particular, the disclosed technology relates to a system that analyzes data posture in a cloud environment database using a snapshot of the database. A computer-implemented method includes receiving a request to access a database in the cloud environment, wherein the database includes a first authentication requirement. The method includes identifying a snapshot of the database, wherein the snapshot includes a second authentication requirement that is different than the first authentication requirement. The method includes accessing the snapshot using the second authentication requirement, generating a representation of the database using the snapshot, and generating a data posture analysis result indicative of a data posture of the database based on scanning the representation of the database.

20 Claims, 33 Drawing Sheets

(56) References Cited

U.S. PATENT DOCUMENTS

| | | | |
|---|---|---|---|
| 8,578,442 | B1 | 11/2013 | Banerjee |
| 8,689,324 | B2 | 4/2014 | Bowman |
| 9,092,500 | B2* | 7/2015 | Varadharajan ........ G06F 16/275 |
| 9,910,881 | B1 | 3/2018 | Brooker |
| 10,032,450 | B2 | 7/2018 | Olmstead |
| 10,609,044 | B2 | 3/2020 | Andow |
| 11,108,828 | B1 | 8/2021 | Curtis |
| 11,256,661 | B1 | 2/2022 | Gassner |
| 11,271,929 | B1 | 3/2022 | McFarland |
| 11,283,809 | B2 | 3/2022 | Bogdanich Espina |
| 11,422,871 | B1 | 8/2022 | Mounirou et al. |
| 11,461,183 | B2* | 10/2022 | Govindan ............ G06F 3/0649 |
| 11,477,183 | B1 | 10/2022 | Brandwine et al. |
| 2004/0034794 | A1 | 2/2004 | Mayer |
| 2006/0236408 | A1 | 10/2006 | Yan |
| 2006/0242704 | A1 | 10/2006 | Aviani |
| 2007/0180498 | A1 | 8/2007 | Choudhary |
| 2007/0185875 | A1 | 8/2007 | Chang |
| 2007/0226796 | A1 | 9/2007 | Gilbert |
| 2008/0104244 | A1 | 5/2008 | Chen |
| 2008/0288330 | A1 | 11/2008 | Hildebrand |
| 2012/0209997 | A1 | 8/2012 | Duan |
| 2012/0210419 | A1 | 8/2012 | Choudhary |
| 2014/0068718 | A1 | 3/2014 | Mureinik |
| 2014/0201642 | A1 | 7/2014 | Vicat-Blanc |
| 2015/0347683 | A1* | 12/2015 | Ansari .................. G16H 10/60 726/7 |
| 2016/0366183 | A1 | 12/2016 | Smith |
| 2017/0063899 | A1 | 3/2017 | Muddu |
| 2017/0078322 | A1 | 3/2017 | Seiver |
| 2017/0155672 | A1 | 6/2017 | Muthukrishnan |
| 2017/0208151 | A1 | 7/2017 | Gil |
| 2017/0299633 | A1 | 10/2017 | Pietrowicz |
| 2018/0232528 | A1 | 8/2018 | Williamson et al. |
| 2019/0228186 | A1 | 7/2019 | Atreya et al. |
| 2019/0243865 | A1 | 8/2019 | Rausch |
| 2020/0007455 | A1 | 1/2020 | Chhabra |
| 2020/0057864 | A1 | 2/2020 | Parthasarathy |
| 2020/0134076 | A1 | 4/2020 | Ogrinz |
| 2020/0186515 | A1 | 6/2020 | Bansal |
| 2020/0213357 | A1 | 7/2020 | Levin et al. |
| 2020/0272740 | A1 | 8/2020 | Obee |
| 2020/0396222 | A1 | 12/2020 | Gargaro |
| 2020/0401696 | A1 | 12/2020 | Ringlein |
| 2021/0014265 | A1 | 1/2021 | Hadar |
| 2021/0084048 | A1 | 3/2021 | Kannan |
| 2021/0089353 | A1 | 3/2021 | Shear |
| 2021/0089422 | A1 | 3/2021 | Kim |
| 2021/0182607 | A1 | 6/2021 | Agarwal |
| 2021/0243190 | A1 | 8/2021 | Bargury et al. |
| 2021/0243208 | A1 | 8/2021 | Rubin |
| 2021/0271565 | A1* | 9/2021 | Bhavanarushi ..... G06F 11/1464 |
| 2021/0336934 | A1 | 10/2021 | Deshmukh et al. |
| 2021/0392142 | A1 | 12/2021 | Stephens et al. |
| 2022/0021652 | A1 | 1/2022 | Moghe |
| 2022/0094614 | A1 | 3/2022 | Khurshid |
| 2022/0094643 | A1 | 3/2022 | Cook |
| 2022/0116455 | A1 | 4/2022 | Raghunath |
| 2022/0198015 | A1 | 6/2022 | Webster |
| 2022/0200869 | A1 | 6/2022 | Erlingsson |
| 2022/0245175 | A1 | 8/2022 | Hawco et al. |
| 2022/0292002 | A1* | 9/2022 | Kumar ................ G06F 11/1484 |
| 2022/0335151 | A1 | 10/2022 | Stephen et al. |

OTHER PUBLICATIONS

Anonymous, Amazon Neptune features, Amazon Neptune, retrieved on Aug. 15, 2022, 9 pages. Retrieved from the Internet [URL: https://aws.amazon.com/neptune/features/ ].

Anonymous, Assign Azure roles using the Azure portal, Microsoft, dated Dec. 29, 2021, 12 pages. Retrieved on Aug. 16, 2022. Retrieved from the internet [URL: https://docs.microsoft.com/en-us/azure/role-based-access-control/role-assignments-portal?tabs=current].

Anonymous, Choose predefined roles, Google Cloud IAM, retrieved on Aug. 15, 2022, 6 pages. Retrieved from the Interent [URL: https://cloud.google.com/iam/docs/choose-predefined-roles].

Anonymous, Install the AWS Security Hub App and view the Dashboards, sumo logic, retrieved on Aug. 15, 2022, 6 pages. Retrieved from the internet [URL: https://help.sumologic.com/07Sumo-Logic-Apps/01Amazon_and_AWS/AWS_Security_Hub/3-Install_the_AWS_Security_Hub_App_and_view_the_Dashboards ].

Anonymous, Policies and permission in IAM, Amazon AWS, retrieved on Aug. 15, 2022, 16 pages. Retrieved from he Internet [URL: https://docs.aws.amazon.com/IAM/latest/UserGuide/access_policies.html].

Anonymous, Policy Evaluation Logic, Amazon AWS User Guide, retrieved on Aug. 15, 2022, 19 pages. Retrieved frm the internet [URL: hllps://docs.aws.amazon.com/IAM/latest/UserGuide/reference_policies_evaluation-logic.html].

Anonymous, Understanding roles, Google Cloud, retrieved on Aug. 15, 2022, 5 pages. Retrieved from the internet URL: https://cloud.google.com/iam/docs/understanding-roles].

Anonymous, What is Azure role-based access control (Azure RBAC)?, Microsoft, dated Jun. 27, 2022, 12 pages. Retrieved on Aug. 16, 2022. Retrieved from the internet [URL: https://docs.microsoft.com/en-us/azure/role-based-access-control/overview].

Anthony, Mastering AWS Security—Create and maintain a secure cloud ecosystem, Packt, dated Oct. 2017, 247 pages.

Broadcom, Symantec Cloud Workload Protection for Storage, retrieved on Aug. 15, 2022, 4 pages. Retrieved from the internet [URL: https://techdocs.broadcom.com/us/en/symantec-security-software/endpoint-security-and-management/cloud-workload-protection-for-storage/1-0.hlml?locale=EN_US].

Jing et al., Discover sensitive data by using custom data identifiers with Amazon Made, Amazon AWS, dated Aug. 26, 2020, 12 pages. Retrieved on Aug. 15, 2022. Retrieved from the internet [URL: https://aws.amazon.com/blogs/security/discover-sensitive-data-by-using-custom-data-identifiers-with-amazon-macie/].

U.S. Appl. No. 17/858,903—Notice of Allowance, dated Sep. 28, 2022, 12 pages.

U.S. Appl. No. 17/858,919—Non-Final Office Action, dated Sep. 16, 2022, 34 pages.

Watson, Classify sensitive data in your environment using Amazon Made, dated Apr. 4, 2018, Amazon AWS, 7 pages. Retrieved on Aug. 15, 2022. Retrieved from the internet [URL: https://aws.amazon.com/blogs/security/classify-sensitive-data-in-your-environment-using-amazon-macie/].

U.S. Appl. No. 17/858,907—Notice of Allowance, dated Dec. 1, 2022, 11 pages.

U.S. Appl. No. 17/858,914—Notice of Allowance, dated Dec. 2, 2022, 3 pages.

U.S. Appl. No. 17/858,914—Notice of Allowance, dated Nov. 21, 2022, 12 pages.

U.S. Appl. No. 17/939,489—Notice of Allowance, dated Nov. 28, 2022, 13 pages.

U.S. Appl. No. 17/939,522—Non-Final Office Action, dated Dec. 19, 2022, 15 pages.

\* cited by examiner

FIG. 6

| Accounts 334 | | | | | |
|---|---|---|---|---|---|
| Search 336 | | | | | Onboard Cloud Account 308 |
| Display Name | Account Id | Data Store Count 338 | Risk Count 306 340 | Scan Status 342 | Last Scan Completed At 344 |
| ACME146 | 6655423 | 27 | 283 | Scanning | 11 minutes ago |
| SFD361 | 5511545 | 4 | 161 | Scanning | 30 minutes ago |
| KR584 | 1870205 | 9 | 186 | Complete | 32 minutes ago |

Sidebar (304):
- Home
- Visualization
- Risks
- Inventory
  - Data
  - Assets
  - Packages
  - Identities
- Data Scan
  - Profiles
  - Entities
  - Scan Settings
- Risk Investigation
  - Risk Signatures
  - Query Builder
  - Automation
- Settings
  - Accounts
  - Api Keys
  - Team Management
  - Integrations

Create Cloud Account

Secure your cloud infrastructure and monitor risks opportunely

Connect your Cloud Account

With Normalyze you can create multiple team workspaces to cover different cloud envorinments and accounts ① Select Cloud Account Provider

[⊙ AWS] [◎ GCP] [⊞ Azure]

② Cloud Account Details

Enter your AWS account ID and nickname to generate template for use in next step Account Id     Account Nickname
[AWS Account Id]   [Account Nickname]

③ Define method and account type

Preferred Method    [Cloudformation] [Terraform]

Would you like to use an exiting cloudtrail?   [Yes] [No]

[Generate Template]

- Home
- Visualization
- Risks

Inventory
- Data
- Assets

Data Scan
- Profiles
- Entities
- Scan Settings

Risk Investigation
- Risk Signatures
- Query Builder
- Automation

Settings
- Accounts
- Api Keys
- Integrations

FIG. 7

Risk Signatures 578

Search

| Name | Signature Id 580 | Description 582 | Result Header 584 | Resource 586 | Tags 588 | Likelihood Factor 590 | Impact Factor 592 |
|---|---|---|---|---|---|---|---|
| s3_bucket_mfa_deletion_not_enabled | 3017 | S3 Bucket's MFA delete is disabled | account_id account_name bucket_id +6 | bucket_arn | aws s3 | 7 | 7 |
| s3_bucket_not_enable_transfer_acceleration | 3022 | S3 Bucket's transfer acceleration is disabled | account_id account_name bucket_id +6 | bucket_arn | aws s3 configuration_check | 3 | 3 |
| s3_bucket_granting_write_access_to_all_authenticated_users | 3026 | S3 Bucket's grants WRITE (Upload/Delete) access to all authenti... | account_id account_name bucket_id +6 | bucket_arn | aws s3 iam | 10 | 10 |
| s3_bucket_server_side_encryption_not_enabled | 3013 | S3 Bucket's default encryption is not enabled | account_id account_name bucket_id +6 | bucket_arn | aws s3 GDPR | 7 | 7 |
| s3_bucket_name_not_dns_compilant | 3012 | S3 Bucket's name is not DNS complaint | account_id account_name bucket_id +6 | bucket_arn | aws s3 | 3 | 3 |
| s3_bucket_not_enable_object_lock | 3021 | S3 Bucket's object lock is not enabled | account_id account_name bucket_id +6 | bucket_arn | aws s3 | 3 | 3 |
| iam_password_policy_with_minimal_length_less_than_14_having_access_to_sensitive_data | 2534 | IAM User's password policy does not require minimal length o... | account_id account_name bucket_id +8 | bucket_arn | aws iam | 10 | 10 |

1-30 of 230 items  < 1 2 3 4 5 ... 8 >  30 / page

Sidebar: Home, Visualization, Risks, Inventory, Data, Assets, Data Scan, Profiles, Entities, Scan Settings, Risk Investigation, Risk Signatures, Query Builder, Automation, Settings, Accounts, Api Keys, Team Management, Integrations

FIG. 12

Risks

Top Risks | All Risks  — 652

Time Range: All

Search: [ 🔍 ] — 654 primaryResourcearn:aws:s3::hr-customer2-demo ⊗ | account Id 23XXXXXX ⊗

| Description | Resource ARN | Account Id | Tags | Impact | Likelihood | Signatureid | |
|---|---|---|---|---|---|---|---|
| s3 Bucket Matches Profile with Personal Data | arn:aws:s3::hr-customer2-demo | 23XXXXXX | GDPR CCPA HIPAA +2 | HIGH | LOW | 10001 | ⛬ |
| s3 bucket contains sensetive data and is also accessbi... | arn:aws:s3::hr-customer2-demo | 23XXXXXX | aws data_protection | HIGH | HIGH | 2107 | ⛬ |
| IAM User's password policy does not require minimal t... | arn:aws:s3::hr-customer2-demo | 23XXXXXX | aws iam | HIGH | HIGH | 2534 | ⛬ |
| IAM User does not have password policy and has access... | arn:aws:s3::hr-customer2-demo | 23XXXXXX | aws iam | HIGH | HIGH | 2537 | ⛬ |
| publicly accessible EC2 instance has access to S3 buck... | arn:aws:s3::hr-customer2-demo | 23XXXXXX | compute security aws | HIGH | HIGH | 4014 | ⛬ |
| S3 Bucket is outside of Europe | arn:aws:s3::hr-customer2-demo | 23XXXXXX | aws s3 GDPR | LOW | LOW | 3000 | ⛬ |
| S3 Bucket's default encryption is not enabled | arn:aws:s3::hr-customer2-demo | 23XXXXXX | aws s3 GDPR | LOW | HIGH | 3013 | ⛬ |
| S3 Bucket's AWS KMS key is disabled | arn:aws:s3::hr-customer2-demo | 23XXXXXX | aws s3 | LOW | HIGH | 3014 | ⛬ |

Data Stores — 702

Search

| Type | Name | Volume | File Type | AccountId | Impact | Likelihood | Risk Entities | Profiles | Resource Id | Provider | Last Scanned | View Risk Items |
|---|---|---|---|---|---|---|---|---|---|---|---|---|
| S3Bucket | hr-cutome... | 93.98MB | +2 | 23XXXXX... | HIGH | HIGH | 100 | GENERAL_PASSWORD (1) GENERAL_USER_OR_NAME (1) GENDER(2) +10 | USERNAME_N_PASSWORD(1) PERSON_N_ADDRESS(1) PERSON_N_EMAIL(23) +1 | arn:aws:s3:... | AWS | 2days ago | 🔍   712 |
| S3Bucket | education-c... | 143.93MB | +3 | 23XXXXX... | HIGH | HIGH | 100 | IP ADDRESS (513) UUID (1) AGE(9) +13 | PERSON N ADDRESS(9) CREDIT CARD N PERSON(2) PERSON_N_MEDICAL_TERMS(7) +1 | arn:aws:s3:... | AWS | 15days ago | 🔍 |
| S3Bucket | cloudirail-n... | 406.19MB | | 19XXXXX... | HIGH | HIGH | 100 | CREDIT CARD NUMBER(14) DOMAIN NAME (23) GENERAL USER ID NAME(23) +12 | | arn:aws:s3:... | AWS | 12hours ago | 🔍 |
| S3Bucket | ads-customs... | 74.96MB | | 23XXXXX... | HIGH | HIGH | 100 | DS_SSN(1) MEDICAL TERMS (2) UUID(3) +12 | PERSON N ADDRESS(4) PERSON_N_EMAIL(32) PERSON_N_PHONE NUMBERS (23) | arn:aws:s3:... | AWS | 15days ago | 🔍 |

Sidebar: Home, Visualization, Risks, Inventory, Data, Assets, Data Scan, Profiles, Entities, Scan Settings, Risk Investigation, Risk Signatures, Query Builder, Automations, Settings, Accounts, Team Management, Integrations

700

704 — Database/Tables Columns Secrets — 706

Overview
- Home
- Visualization
- Risks  1038

Inventory
- Data
- Assets  1020
- Packages
- Identities  1052

Data Scan
- Profiles
- Entities
- Scan Settings

Risk Investigation
- Risk Signatures
- Query Builder
- Automations

Settings

Data Stores  1036

[Unstructured] [Structured] [Secrets]

[Datastores] [Databases] [Tables] [Columns]

Search... 1022  1024  1026  1028  1030  1032  1033  1034  1035

| Name | Type | Volume | Engine | Likelihood | Impact | Entities | | Profiles |
|---|---|---|---|---|---|---|---|---|
| ABC | RDS-INSTANCE | 20GB | MYSQL | HIGH | HIGH | DOMAIN_NAME (9) PHONE_NUMBER (3) EMAIL_ADDRESS (40) +3 | | PERSON_N_EMAIL (23) |
| rds-mysql-log-scan | RDS-INSTANCE | 100GB | MYSQL | HIGH | HIGH | US_SSN (18) EMAIL_ADDRESS (24) DATE (20) | | |
| status-postgresql-cluster-0 | RDS-INSTANCE | 1GB | AURORA-P... | HIGH | LOW | | | |
| retool-postgresql-cluster | RDS-INSTANCE | 1GB | aurora-post... | LOW | LOW | | | |
| ec-mongodb-instance | EC2DB-INSTANCE | 1GB | monogo | LOW | LOW | | | |

Risk Score | Owner | Average Size
100
100
0
0
0

Get summary report 1016
1018

FIG. 22

CLOUD ENVIRONMENT ANALYTICS USING SNAPSHOTTING

CROSS-REFERENCE TO RELATED APPLICATIONS

The present application claims the benefit of U.S. provisional patent application Serial Nos. 63/246,303, filed Sep. 20, 2021, 63/246,310, filed Sep. 21, 2021, 63/246,313, filed Sep. 21, 2021, and 63/246,315, filed Sep. 21, 2021; the contents of these applications are hereby incorporated by reference in their entirety. The present application is also related to U.S. patent application Ser. No. 17/858,903, filed Jul. 6, 2022, Ser. No. 17/858,907, filed Jul. 6, 2022, Ser. No. 17/858,914, filed Jul. 6, 2022, and Ser. No. 17/858,919, filed Jul. 6, 2022; the contents of these applications are hereby incorporated by reference in their entirety.

FIELD OF THE TECHNOLOGY DISCLOSED

The technology disclosed generally relates to cloud environments. More specifically, but not by limitation, the present disclosure relates to improved systems and methods of cloud security posture management (CSPM), cloud infrastructure entitlement management (CIEM), cloud-native application protection platform (CNAPP), and/or cloud-native configuration management database (CMDB).

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

Cloud computing provides on-demand availability of computer resources, such as data storage and compute resources, often without direct active management by users. Thus, a cloud environment can provide computation, software, data access, and storage services that do not require end-user knowledge of the physical location or configuration of the system that delivers the services. In various examples, remote servers can deliver the services over a wide area network, such as the Internet, using appropriate protocols, and those services can be accessed through a web browser or any other computing component.

Examples of cloud storage services include Amazon Web Services™ (AWS), Google Cloud Platform™ (GCP), and Microsoft Azure™, to name a few. Such cloud storage services provide on-demand network access to a shared pool of configurable resources. These resources can include networks, servers, storage, applications, services, etc. The end-users of such cloud services often include organizations that have a need to store sensitive and/or confidential data, such as personal information, financial information, medical information. Such information can be accessed by any of a number of users through permissions and access control data assigned or otherwise defined through administrator accounts.

The discussion above is merely provided for general background information and is not intended to be used as an aid in determining the scope of the claimed subject matter.

SUMMARY

The technology disclosed relates to streamlined analysis of security posture of a cloud environment. In particular, the disclosed technology relates to a system that analyzes data posture in a cloud environment database using a snapshot of the database. A computer-implemented method includes receiving a request to access a database in the cloud environment, wherein the database includes a first authentication requirement. The method includes identifying a snapshot of the database, wherein the snapshot includes a second authentication requirement that is different than the first authentication requirement. The method includes accessing the snapshot using the second authentication requirement, generating a representation of the database using the snapshot, and generating a data posture analysis result indicative of a data posture of the database based on scanning the representation of the database.

Example 1 is a computer-implemented method for analyzing data posture in a cloud environment, the method comprising:
  receiving a request to access a database in the cloud environment, wherein the database includes a first authentication requirement;
  identifying a snapshot of the database, wherein the snapshot includes a second authentication requirement that is different than the first authentication requirement;
  accessing the snapshot using the second authentication requirement;
  generating a representation of the database using the snapshot; and
  generating a data posture analysis result indicative of a data posture of the database based on scanning the representation of the database.

Example 2 is the computer-implemented method of any or all previous examples, wherein the first authentication requirement comprises a user access credential, and the second authentication requirement comprises a cloud environment role.

Example 3 is the computer-implemented method of any or all previous examples, wherein the user access credential comprises secret data corresponding to a user associated with the database, and wherein the cloud environment role comprises a cloud provider role.

Example 4 is the computer-implemented method of any or all previous examples, wherein the database comprises a first database having a first user access credential, and wherein the snapshot comprises a first snapshot, and further comprising:
  receiving a request to access a second database in the cloud environment, wherein the second database includes a second user access credential that is different than the first user access credential; and
  identifying a second snapshot of the second database, wherein the second snapshot includes a same authentication requirement as the first snapshot.

Example 5 is the computer-implemented method of any or all previous examples, and further comprising:
  discovering the first and second snapshots using a cloud provider application programming interface (API); and
  accessing each of the first and second snapshots through the cloud provider API.

Example 6 is the computer-implemented method of any or all previous examples, wherein generating the data posture analysis result comprises:
  obtaining metadata representing a structure of schema objects in the database; and based on the metadata, executing a content-based data classifier to classify data items in the schema objects.

Example 7 is the computer-implemented method of any or all previous examples, wherein the database is stored on a first server in the cloud environment, generating the representation of the database comprises recreating the database on a second server using the snapshot, and scanning the representation of the database comprises scanning the recreated database on the second server.

Example 8 is the computer-implemented method of any or all previous examples, wherein the snapshot comprises a read-only point-in-time copy of the database.

Example 9 is the computer-implemented method of any or all previous examples, wherein the database is deployed in a production environment and configured to receive a user request for a data manipulation operation on data stored in the database.

Example 10 is a computing system comprising at least one processor; and memory storing instructions executable by the at least one processor, wherein the instructions, when executed, cause the computing system to:

receive a request to access a database in a cloud environment, wherein the database includes a user-based authentication credential;

identify a point-in-time copy of the database that includes a role-based authentication credential;

access the point-in-time copy using the role-based authentication credential;

generate a representation of the database using the point-in-time copy; and generate a data posture analysis result indicative of a data posture of the database based on scanning the representation of the database.

Example 11 is the computing system of any or all previous examples, wherein the user-based authentication credential comprises a user access credential, and the role-based authentication credential comprises a cloud provider role.

Example 12 is the computing system of any or all previous examples, wherein the user access credential comprises secret data corresponding to a user associated with the database.

Example 13 is the computing system of any or all previous examples, wherein the database comprises a first database having a first user access credential, and wherein the point-in-time copy comprises a first point-in-time copy, and wherein the instructions, when executed, cause the computing system to:

receive a request to access a second database in the cloud environment, wherein the second database includes a second user access credential that is different than the first user access credential; and identify a second point-in-time copy of the second database, wherein the second point-in-time copy includes a same authentication requirement as the first point-in-time copy.

Example 14 is the computing system of any or all previous examples, wherein the instructions, when executed, cause the computing system to:

discover the first and second point-in-time copies using a cloud provider application programing interface (API); and access each of the first and second point-in-time copies through the cloud provider API using the same authentication requirement.

Example 15 is the computing system of any or all previous examples, wherein the instructions, when executed, cause the computing system to:

obtain metadata representing a structure of schema objects in the database; and based on the metadata, execute a content-based data classifier to classify data items in the schema objects.

Example 16 is the computing system of any or all previous examples, wherein the database is deployed in a production environment and configured to receive a user request for a data manipulation operation on data stored in the database.

Example 17 is a computing system comprising:

at least one processor; and memory storing instructions executable by the at least one processor, wherein the instructions, when executed, cause the computing system to:

receive one or more requests to access a plurality of databases in the cloud environment, wherein the plurality of databases includes different sets of authentication requirements;

identify a plurality of snapshots that correspond to the plurality of databases, wherein the plurality of snapshots includes a same authentication requirement;

access each snapshot of the plurality of snapshots using the same authentication requirement;

generate a set of representations of the plurality of databases using the plurality of snapshots; and generate a data posture analysis result indicative of a data posture of the plurality of databases based on scanning the set of representations.

Example 18 is the computing system of any or all previous examples, wherein a first database of the plurality of databases has a first user access credential, and a second database of the plurality of databases has a second user access credential.

Example 19 is the computing system of any or all previous examples, wherein each particular snapshot of the plurality of snapshots comprises a read-only point-in-time copy of the database corresponding to the particular snapshot.

Example 20 is the computing system of any or all previous examples, wherein the database is stored on a first server in the cloud environment, and the instructions, when executed, cause the computing system to:

recreate each particular database, of the plurality of databases, in a cloud environment server using the snapshot corresponding to the particular database, and scan the recreated databases to identify the data posture.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings, in which:

FIG. 6 illustrates one example of a user interface display representing on-boarded cloud accounts.

FIG. 7 illustrates one example of an on-boarding user interface display.

FIGS. 10-1, 10-2, 10-3, and 10-4 (collectively referred to as FIG. 10) provide a flow diagram illustrating an example operation for streamlined analysis of security posture.

FIG. 12 illustrates one example of a user interface display that displays a set of risk signatures.

FIG. 13 illustrates one example of a user interface display that graphically depicts vulnerability risks.

FIG. 14 illustrates one example of a details display pane.

FIG. 15 illustrates one example of a user interface display that graphically depicts breach likelihood and impact scores.

FIG. 20 illustrates an example user interface display that displays identified data stores.

FIG. 22 illustrates an example user interface display for selecting a connection type for connecting a data store.

FIGS. 23-1 and 23-2 (collectively referred to as FIG. 23) provide a flow diagram illustrating one example of performing content-based classification of data items.

FIGS. 24-1 and 24-2 (collectively referred to as FIG. 24) provide a flow diagram of an example operation of a cloud data schema detection system that performs data posture analytics using snapshotting.

DETAILED DESCRIPTION

Figure 1:
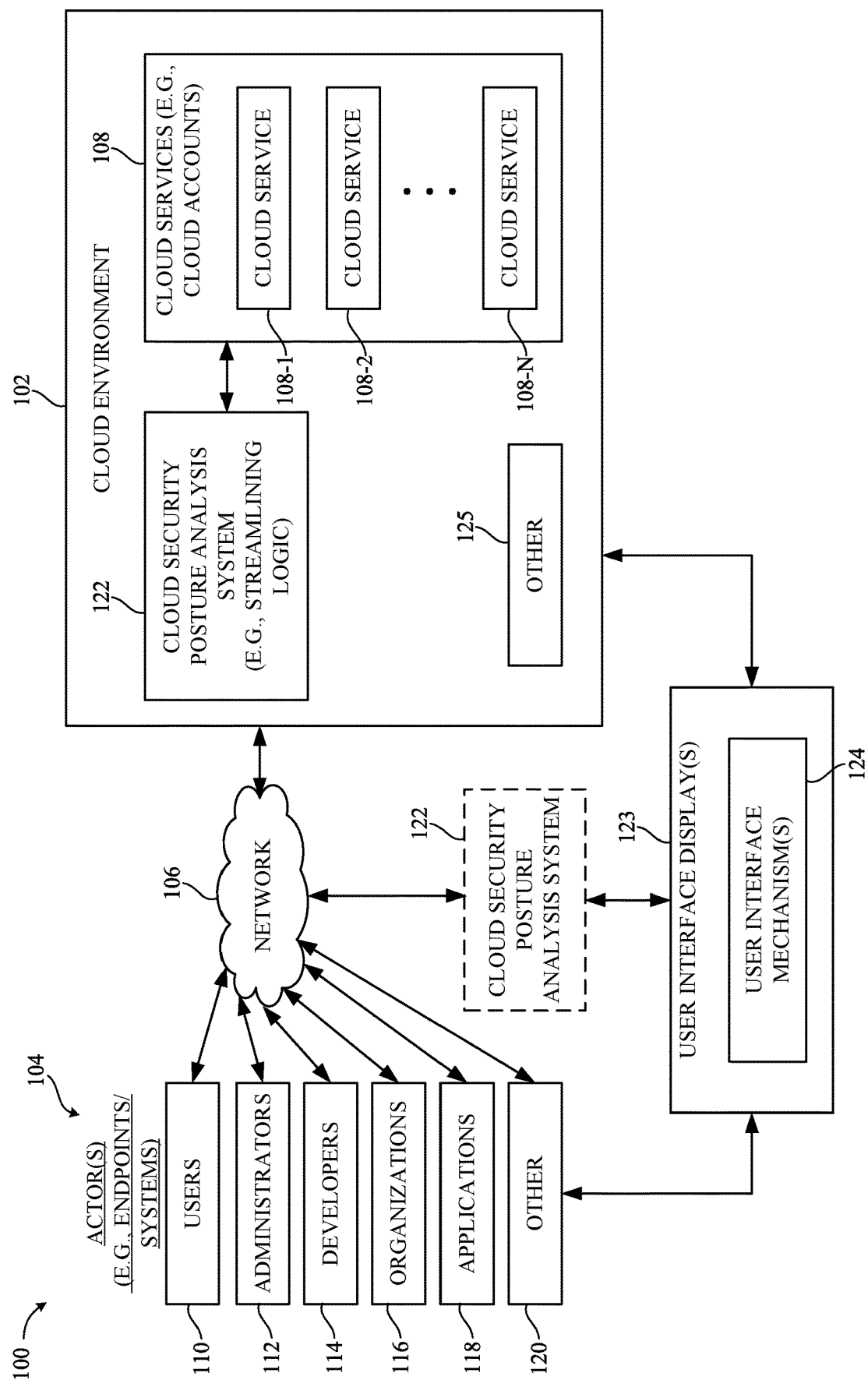
FIG. 1 is a block diagram illustrating one example of a cloud architecture.

The following discussion is presented to enable any person skilled in the art to make and use the technology disclosed, and is provided in the context of a particular application and its requirements. Various modifications to the disclosed implementations will be readily apparent to those skilled in the art, and the general principles defined herein may be applied to other implementations and applications without departing from the spirit and scope of the technology disclosed. Thus, the technology disclosed is not intended to be limited to the implementations shown, but is to be accorded the widest scope consistent with the principles and features disclosed herein.

As noted above, cloud computing environments are used by organizations or other end-users to store a wide variety of different types of information in many contexts and for many uses. This data can often include sensitive and/or confidential information, and can be the target for malicious activity such as acts of fraud, privacy breaches, data theft, etc. These risks can arise from individuals that are both inside the organization as well as outside the organization.

Cloud environments often include security infrastructure to enforce access control, data loss prevention, or other processes to secure data from potential vulnerabilities. However, even with such security infrastructures, it can be difficult for an organization to understand the data posture and breadth of access to the data stored in the cloud in the organization's cloud account. In other words, it can be difficult to identify which users have access to which data, and which data may be exposed to malicious or otherwise unauthorized users, both inside or outside the organization.

The present system is directed to a cloud security posture analysis system configured to analyze and take action on the security posture of a cloud account. The system can discover sensitive data among the cloud storage resources and discover access patterns to the sensitive data. The results can be used to identify security vulnerabilities to understand the data security posture, detect and remediate the security vulnerabilities, and to prevent future breaches to sensitive data. The system provides real-time visibility and control on the control data infrastructure by discovering resources, sensitive data, and access paths, and tracking resource configuration, deep context and trust relationships in real-time as a graph or other visualization. It is noted that the technology disclosed herein can depict all graph embodiments in equivalent and analogous tabular formats or other visualization formats based on the data and logic disclosed herein.

The system can further score breach paths based on sensitivity, volume, and/or permissions to show an attack surface and perform constant time scanning, by deploying scanners locally within the cloud account. Thus, the scanners execute in the cloud service itself, with metadata being returned indicative of the analysis. Thus, in one example, an organization's cloud data does not leave the organization's cloud account. Rather, the data can be scanned in place and metadata sent for analysis by the cloud security posture analysis system, which further enhances data security.

FIG. 1 is a block diagram illustrating one example of a cloud architecture 100 in which a cloud environment 102 is accessed by one or more actors 104 through a network 106, such as the Internet or other wide area network. Cloud environment 102 includes one or more cloud services 108-1, 108-2, 108-N, collectively referred to as cloud services 108.

As noted above, cloud services 108 can include cloud storage services such as, but not limited to, AWS, GCP, Microsoft Azure, to name a few.

Further, cloud services 108-1, 108-2, 108-N can include the same type of cloud service, or can be different types of cloud services, and can be accessed by any of a number of different actors 104. For example, as illustrated in FIG. 1, actors 104 include users 110, administrators 112, developers 114, organizations 116, and/or applications 118. Of course, other actors 120 can access cloud environment 102 as well.

Architecture 100 includes a cloud security posture analysis system 122 configured to access cloud services 108 to identify and analyze cloud security posture data. Examples of system 122 are discussed in further detail below. Briefly, however, system 122 is configured to access cloud services 108 and identify connected resources, entities, actors, etc. within those cloud services, and to identify risks and violations against access to sensitive information. As shown in FIG. 1, system 122 can reside within cloud environment 102 or outside cloud environment 102, as represented by the dashed box in FIG. 1. Of course, system 122 can be distributed across multiple items inside and/or outside cloud environment 102.

Users 110, administrators 112, developers 114, or any other actors 104, can interact with cloud environment 102 through user interface displays 123 having user interface mechanisms 124. For example, a user can interact with user interface displays 123 provided on a user device (such as a mobile device, a laptop computer, a desktop computer, etc.) either directly or over network 106. Cloud environment 102 can include other items 125 as well.

Figure 2:
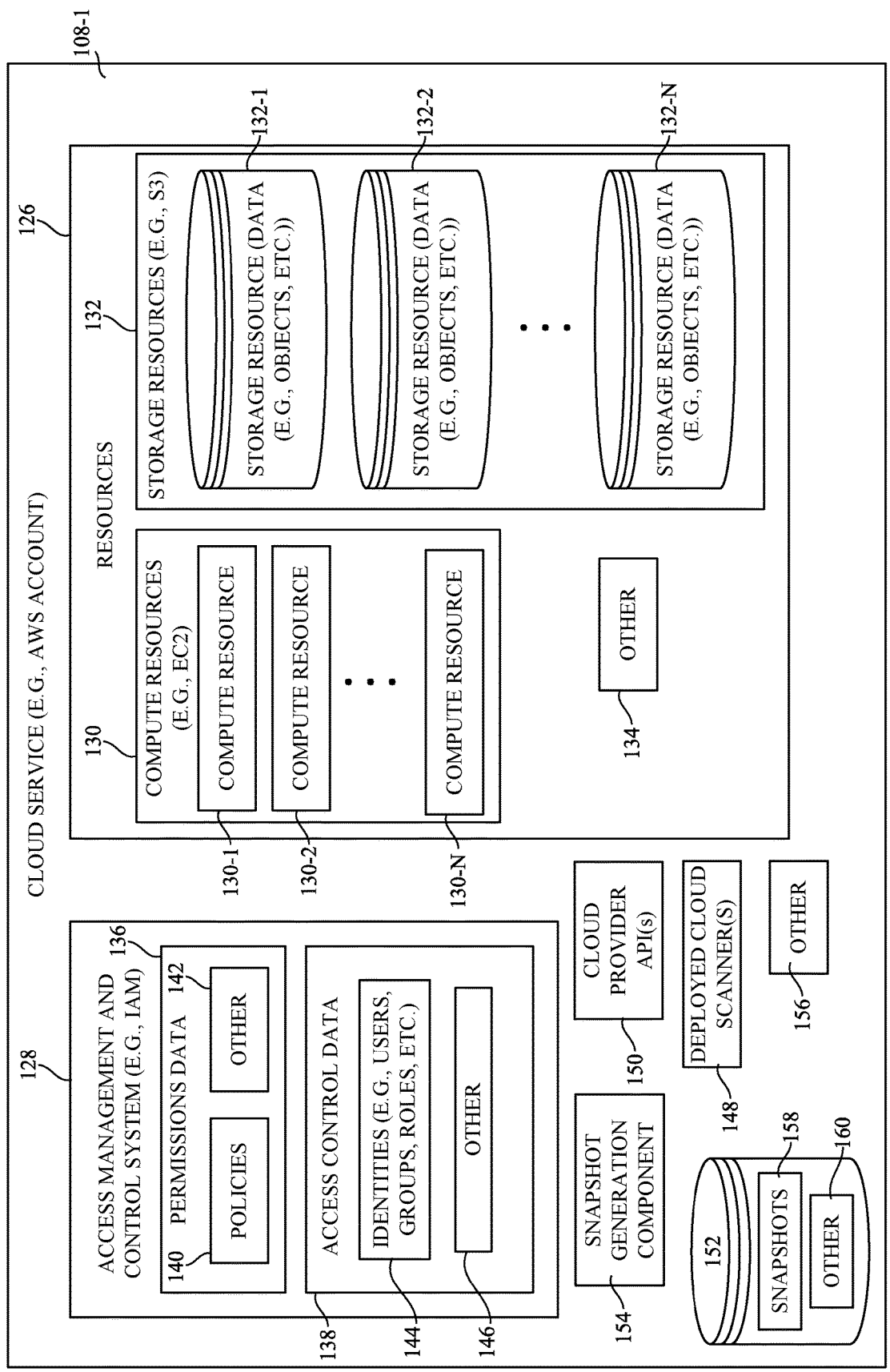
FIG. 2 is a block diagram illustrating one example of a cloud service.

FIG. 2 is a block diagram illustrating one example of cloud service 108-1. For the sake of the present discussion, but not by limitation, cloud service 108-1 will be discussed in the context of an account within AWS. Of course, other types of cloud services and providers are within the scope of the present disclosure.

Cloud service 108-1 includes a plurality of resources 126 and an access management and control system 128 configured to manage and control access to resources 126 by actors 104. Resources 126 include compute resources 130, storage resources 132, and can include other resources 134. Compute resources 130 include a plurality of individual compute resources 130-1, 130-2, 130-N, which can be the same and/or different types of compute resources. In the present example, compute resources 130 can include elastic compute resources, such as elastic compute cloud (AWS EC2) resources, AWS Lambda, etc.

An elastic compute cloud (EC2) is a cloud computing service designed to provide virtual machines called instances, where users can select an instance with a desired amount of computing resources, such as the number and type of CPUs, memory and local storage. An EC2 resource allows users to create and run compute instances on AWS, and can use familiar operating systems like Linux, Windows, etc. Users can select an instance type based on the memory and computing requirements needed for the application or software to be run on the instance.

AWS Lambda is an event-based service that delivers short-term compute capabilities and is designed to run code without the need to deploy, use or manage virtual machine instances. An example implementation is used by an organization to address specific triggers or events, such as database updates, storage changes or custom events generated from other applications. Such a compute resource can include a server-less, event-driven compute service that allows a user to run code for many different types of applications or backend services without provisioning or managing servers.

Storage resources 132 are accessible through compute resources 130, and can include a plurality of storage resources 132-1, 132-2, 132-N, which can be the same and/or different types of storage resources. A storage resource 132 can be defined based on object storage. For example, AWS Simple Storage Service (S3) provides highly-scalable cloud object storage with a simple web service interface. An S3 object can contain both data and metadata, and objects can reside in containers called buckets. Each bucket can be identified by a unique user-specified key or file name. A bucket can be a simple flat folder without a file system hierarchy. A bucket can be viewed as a container (e.g., folder) for objects (e.g., files) stored in the S3 storage resource.

Compute resources 130 can access or otherwise interact with storage resources 132 through network communication paths based on permissions data 136 and/or access control data 138. System 128 illustratively includes identity and access management (IAM) functionality that controls access to cloud service 108-1 using entities (e.g., IAM entities) provided by the cloud computing platform.

Permissions data 136 includes policies 140 and can include other permissions data 142. Access control data 138 includes identities 144 and can include other access control data 146 as well. Examples of identities 144 include, but are not limited to, users, groups, roles, etc. In AWS, for example, an IAM user is an entity that is created in the AWS service and represents a person or service who uses the IAM user to interact with the cloud service. An IAM user provides the ability to sign into the AWS management console for interactive tasks and to make programmatic requests to AWS services using the API, and includes a name, password, and access keys to be used with the API. Permissions can be granted to the IAM user to make the IAM user a member of a user group with attached permission policies. An IAM user group is a collection of IAM users with specified permissions. Use of IAM groups can make management of permissions easier for those users. An IAM role in AWS is an IAM identity that has specific permissions, and has some similarities to an IAM user in that the IAM role is an AWS identity with permission policies that determine what the identity can and cannot do in AWS. However, instead of being uniquely associated with one person, a role is intended to be assumable by anyone who needs it. Roles can be used to delegate access to users, applications, and/or services that don't normally have access to the AWS resources. Roles can be used by IAM users in a same AWS account and/or in different AWS accounts than the role. Also, roles can be used by compute resources 130, such as EC2 resources. A service role is a role assumed by a service to perform actions in an account on behalf of a user. Service roles include permissions required for the service to access the resources needed by the service. Service roles can vary from service to service. A service role for an EC2 instance, for example, is a special type of service role that an application running on an EC2 instance can assume to perform actions.

Policies 140 can include identity-based policies that are attached to IAM identities can grant permissions to the identity. Policies 140 can also include resource-based policies that are attached to resources 126. Examples include S3 bucket policies and IAM role trust policies. An example trust policy includes a JSON policy document that defines the principles that are trusted to assume a role. In AWS, a policy is an object that, when associated with an identity or resource, defines permissions of the identity or resource. AWS evaluates these policies when an IAM principal user or a role) makes a request. Permissions in the policy determine whether the request is allowed or denied. Policies are often stored as JSON documents that are attached to the IAM identities (user, groups of users, role).

A permissions boundary is a managed policy for an IAM identity that defines the maximum permissions that the identity-based policies can grant to an entity, but does not grant the permissions. Further, access control lists (ACLs) control which principles in other accounts can access the resource to which the ACL is attached. ACLs can be similar to resource-based policies. In some implementations of the technology disclosed, the terms "roles" and "policies" are used interchangeably.

Cloud service 108-1 includes one or more deployed cloud scanners 148, cloud provider application programming interface(s) (APIs) 150, a data store 152, a snapshot generation component 154, and can include other items 156 as well. Cloud scanner 148 run locally on the cloud-based services and the server systems, and can utilize elastic compute resources, such as, but not limited to, AWS Lambda resources. Cloud scanner 148 is configured to access and scan the cloud service 108-1 on which the scanner is deployed. Examples are discussed in further detail below. Briefly, however, a scanner accesses the data stored in storage resources 132, permissions data 136, and access control data 138 to identify particular data patterns (such as, but not limited to, sensitive string patterns) and traverse or trace network communication paths between pairs of compute resources 130 and storage resources 132. The results of the scanner can be utilized to identify subject vulnerabilities, such as resources vulnerable to a breach attack, and to construct a cloud attack surface graph or other data structure that depicts propagation of a breach attack along the network communication paths.

Given a graph of connected resources, such as compute resources 130, storage resources 132, etc., entities (e.g., accounts, roles, policies, etc.), and actors (e.g., users, administrators, etc.), risks and violations against access to sensitive information is identified. A directional graph can be built to capture nodes that represent the resources and labels that are assigned for search and retrieval purposes. For example, a label can mark the node as a database or S3 resource, actors as users, administrators, developers, etc. Relationships between the nodes are created using information available from the cloud infrastructure configuration. For example, using the configuration information, system 122 can determine that a resource belongs to a given account and create a relationship between the policy attached to a resource and/or identify the roles that can be taken up by a user.

Snapshot generation component 154 is configured to generate snapshots 158, which include representations of databases in storage resources 132. The snapshots can be generated automatically, such as periodically in response to a time constraint (hourly, daily, etc.). A snapshot includes a read-only point-in-time copy of a database, and includes information suitable to generate a recreation of the database, for example on another server for data posture analysis. This is discussed in further detail below.

As noted above, in some examples, resources 126 can include AWS EC2 and/or Lambda resources. Also, resources 126 can include AWS Instance Stores and/or AWS Elastic Block Store (EBS) volumes. An EBS volume is a durable, block-level storage device that can attach to a compute instance and used as a physical hard drive. In one example, a snapshot 158 can include an EBS snapshot, that is a point-in-time backup copy of an EBS volume stored in an AWS S3 resource. Further, the snapshots can be incremental backups of the data, so that a given snapshot stores changes since a previous snapshot was taken.

Resources 126 can also include an Azure blob identified by a resource URL syntax that assigns each resource a corresponding base URL. A snapshot 158 can include a read-only version of a blob stored as the blob was at the time the snapshot was created. The snapshot 158 can be used to create a backup or checkpoint of a blob, wherein the snapshot blob name includes the base blob URI plus a date-time value that indicates when the snapshot was created.

A cloud storage service or cloud service provider (CSP) can include an organization which hosts services such as networking, software, servers, and/or infrastructure, among others. A CSP can also provide security for the provided services. The services provided by the CSP can relieve a client organization of individual responsibility of setting and managing infrastructure. Examples of CSPs include Amazon Web Services™, Microsoft Azure™, Salesforce™, Google Cloud Platform™, among others.

Cloud provider APIs 150 are configured to receive calls to access various components in cloud service 108. For example, cloud provider APIs 150 can access snapshots 158 stored in data store 152. Data store 152 can also store other data items 160 as well.

A CSP generally provides a number of different interfaces to cloud-computing services, such as a service-provider interface to organizational clients for computing services. A CSP, for example, provides interfaces that allow cloud-computing clients to launch virtual machines, application programs, and other computational entities. A CSP can also provide user interface that allow claims to access, through the Internet, the services provided by the CSP. A client of the CSP can deploy web servers to access, modify, and sending information.

A cloud account provided by a CSP includes roles that determine user privileges users and what actions can be taken in the cloud account. An identify and access management (IAM) role is managed by the CSP and provides predefined roles that give granular access to specific CSP resources and prevent unwanted access to other CSP resources. For instance, an AWS IAM role includes an AWS identity with a set of permissions policies that each determine what the role can do within an AWS account. An IAM role can be assumed by anyone who needs requires the role.

For sake of illustration, but not by limitation, a service role can be assumed by an AWS service to perform actions on behalf of users. For instance, as a service that performs backup operations for a client, Amazon Data Lifecycle Manager requires that the client pass in a role to assume when performing policy operations on the client's behalf. That role must have an IAM policy with the permissions that enable Amazon Data Lifecycle Manager to perform actions associated with policy operations, such as creating snapshots and Amazon Machine Images (AMIs), copying snapshots and AMIs, deleting snapshots, and deregistering AMIs. Different permissions are required for each of the Amazon Data Lifecycle Manager policy types. The role must also have Amazon Data Lifecycle Manager listed as a trusted entity, which enables Amazon Data Lifecycle Manager to assume the role.

In examples discussed herein, while a database is accessible using a first authentication requirement (e.g., a username and password), the snapshot 158 generated for that database is accessible (e.g., from data store 152) using a different authentication requirement (e.g., a cloud provider role through cloud provider APIs 150). Thus, where a plurality of different sets of authentication credentials (different sets of usernames and passwords) are needed to access a plurality of databases in a given cloud account, a same authentication credential (a cloud provider role) can be utilized to access some or all of those snapshots. This improves efficiency through reduction in network bandwidth and processing load otherwise needed to access all of the data to be analyzed for those databases.

Figure 3:
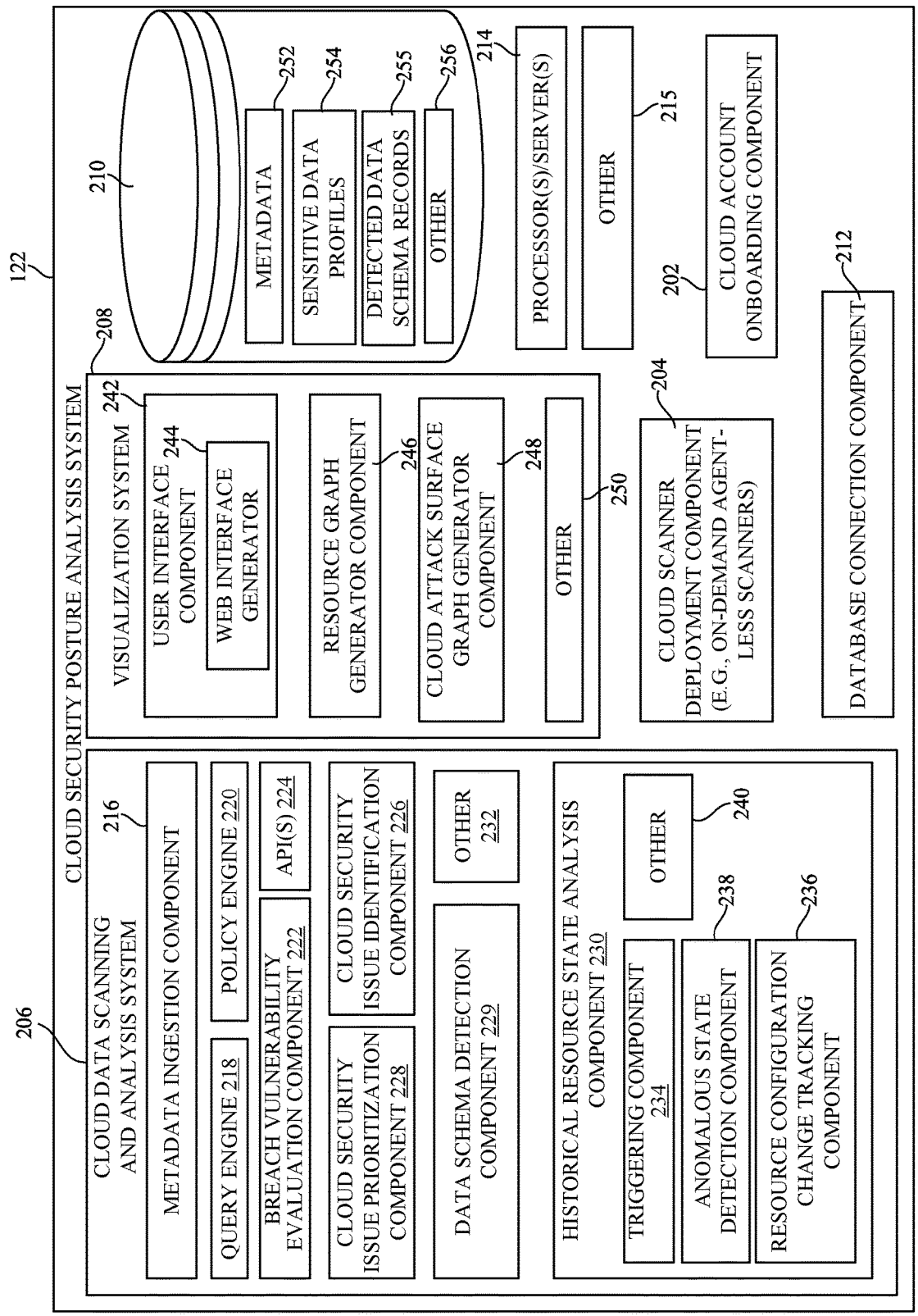
FIG. 3 is a block diagram illustrating one example of a cloud security posture analysis system.

FIG. 3 is a block diagram illustrating one example of cloud security posture analysis system 122. As noted above, system 122 can be deployed in cloud environment 102 and/or access cloud environment 102 through network 106 shown in FIG. 1.

System 122 includes a cloud account onboarding component 202, a cloud scanner deployment component 204, a cloud data scanning and analysis system 206, a visualization system 208, and a data store 210. System 122 can also include a database connection component 212, one or more processors or servers 214, and can include other items 215 as well.

Cloud account onboarding component 202 is configured to onboard cloud services 108 for analysis by system 122. After onboarding, cloud scanner deployment component 204 is configured to deploy a cloud scanner (e.g., deployed cloud scanner(s) 148 shown in FIG. 2) to the cloud service. In one example, the deployed scanners are on-demand agent-less scanners configured to perform agent-less scanning within the cloud service. One example of an agent-less scanner does not require agents to be installed on each specific device or machine. The scanners operate on the resources 126 and access management and control system 128 directly within the cloud service, and generate metadata that is returned to system 122. Thus, in one example, the actual cloud service data is not required to leave the cloud service for analysis.

Cloud data scanning and analysis system 206 includes a metadata ingestion component 216 configured to receive the metadata generated by the deployed cloud scanner(s) 148. System 206 also includes a query engine 218, a policy engine 220, a breach vulnerability evaluation component 222, one or more application programming interfaces (APIs) 224, a cloud security issue identification component 226, a cloud security issue prioritization component 228, a data schema detection component 229, a historical resource state analysis component 230, and can include other items 232 as well.

Query engine 218 is configured to execute queries against the received metadata and generated cloud security issue data. Policy engine 220 can execute security policies against the cloud data and breach vulnerability evaluation component 222 is configured to evaluate potential breach vulnerabilities in the cloud service. APIs 224 are exposed to users, such as administrators, to interact with system 122 to access the cloud security posture data.

Component 226 is configured to identify cloud security issues and component 228 can prioritize the identified cloud security issues based on any of a number of criteria.

Historical resource state analysis component 230 is configured to analyze a history of states of resources 126. Historical resource state analysis component 230 includes a triggering component 234 configured to detect a trigger that to perform historical resource state analysis. Triggering component 234 is configured to identify an event that triggers component 230 to analyze the state of resources 126. The event can be, for example, a user input to selectively trigger the analysis, or a detected event such as the occurrence of a time period, an update to a resource, etc. Accordingly, historical resource state can be tracked automatically and/or in response to user input.

Historical resource state analysis component 230 includes a resource configuration change tracking component 236 configured to track changes in the configuration of resources 126. Component 230 also includes an anomalous state detection component 238, and can include other items 240 as well. Component 238 is configured to detect the occurrence of anomalous states in resources 126. A resource anomaly can be identified where a given resource has an unexpected state, such as a difference from other similar resources identified in the cloud service.

Visualization system 208 is configured to generate visualizations of the cloud security posture from system 206. Illustratively, system 208 includes a user interface component 242 configured to generate a user interface for a user, such as an administrator. In the illustrated example, component 242 includes a web interface generator 244 configured to generate web interfaces that can be displayed in a web browser on a client device.

Visualization system 208 also includes a resource graph generator component 246, a cloud attack surface graph generator component 248, and can include other items 250 as well. Resource graph generator component 246 is configured to generate a graph or other representation of the relationships between resources 126. For example, component 246 can generate a cloud infrastructure map that graphically depicts pairs of compute resources and storage resources as nodes and network communication paths as edges between the nodes.

Cloud attack surface graph generator component 248 is configured to generate a surface graph or other representation of vulnerabilities of resources to a breach attack. In one example, the representation of vulnerabilities can include a cloud attack surface map that graphically depicts propagation of a breach attack along network communication paths as edges between nodes that represent the corresponding resources.

Data store 210 stores metadata 252 obtained by metadata ingestion component 216, sensitive data profiles 254, detected data schema records 255, and can store other items 256 as well. Examples of sensitive data profiles 254 are discussed in further detail below. Briefly, however, sensitive data profiles 254 can identify target data patterns that are to be categorized as sensitive or conforming to a predefined pattern of interest. Sensitive data profiles 254 can be used as training data for data classification performed by data schema detection component 229. Examples of data classification are discussed in further detail below. For instance, however, pattern matching can be performed based on the target data profiles. Illustratively, pattern matching can be performed to identify instances of data patterns corresponding to social security numbers, credit card numbers, other personal data, medical information, to name a few. In one example, artificial intelligence (AI) is utilized to perform named entity recognition (e.g., natural language processing modules can identify sensitive data, in various languages, representing names, company names, locations, etc.).

Detected data schema records 255 store detected instances of the target data profiles or entities that are returned based on content-based classification of the cloud data. An example detected data schema record 255 can store any of a variety of different data items representing the detected instance corresponding to the data record, including, but not limited to, a data store identifier, a database identifier, a table name identifier, a column name identifier, a column type identifier, a target data entity identifier, and/or a confidence score, among other data. A data store identifier identifies a particular data store that contains the detected instance of the target data profiles. A database identifier identifies a particular database, in the particular data store, that contains the detected instance of the target data profiles. A table name identifier identifies a particular table, in the particular database, that contains the detected instance of the target data profiles. A column name identifier identifies the column name associated with a particular column that contains the detected instance of the target data profiles. A column type identifier identifies a data type (e.g., date, integer, timestamp, character string, decimal, etc.). A target data entity identifier identifies the target data profile that was matched in the detected instance. A confidence score identifies a confidence associated with the classification.

Database connection component 212 is configured to connect to, or access, databases in the data stores of the resources being analyzed by system 122. This is discussed in further detail below. Briefly, however, database connection component 212 can receive user access credentials, such as a username and password, for each database of a plurality of databases to be accessed in the cloud environment and scanned by the deployed scanners. In another example, database connection component 212 can be configured to connect to representations of the databases that are accessed using a different authentication requirement, than the databases themselves. For example, database connection component 212 can identify and connect to snapshots of the databases through cloud provider APIs 150, discussed above. Database connection component 212 can access snapshots 158 for the identified databases from data store 152, and recreate those databases on a server in the cloud environment. The scanners can then be run on the recreated databases, allowing for the scanning of the cloud account data without accessing the actual production environment used by the end users. This can improve security of the scanning process, as well as to reduce processing requirements in obtaining the access credentials for each individual database, and then having to access those databases individually.

Figure 4:
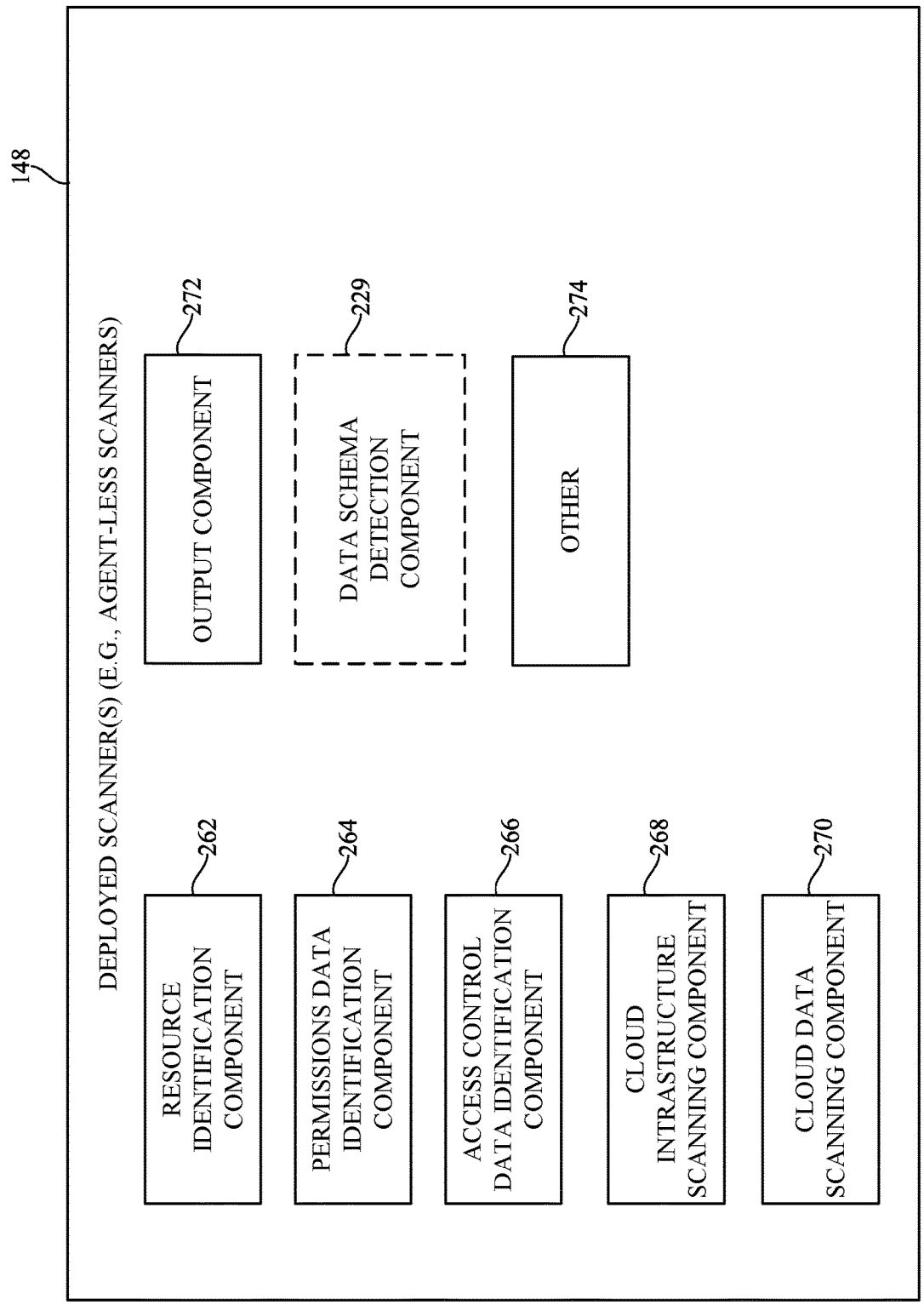
FIG. 4 is a block diagram illustrating one example of a deployed scanner.

FIG. 4 is a block diagram illustrating one example of a deployed scanner 148. Scanner 148 includes a resource identification component 262, a permissions data identification component 264, an access control data identification component 266, a cloud infrastructure scanning component 268, a cloud data scanning component 270, an output component 272, and can include other items 274 as well. FIG. 4 also illustrates that some or all components of and/or functionality performed by data schema detection component 229 can be on or otherwise associated with deployed scanner 148.

Resource identification component 262 is configured to identify the resources 126 within cloud service 108-1 (and/or other cloud services 108) and to generate corresponding metadata that identifies these resources. Permissions data identification component 264 identifies the permissions data 136 and access control data identification component 266 identifies access control data 138. Cloud infrastructure scanning component 268 scans the infrastructure of cloud service 108 to identify the relationships between resources 130 and 132 and cloud data scanning component 270 scans the actual data stored in storage resources 132. Output component 272 is configured to output the generated metadata and content-based classification results to cloud security posture analysis system 122.

The metadata generated by scanner 148 can indicate a structure of schema objects in a data store. For example, where the schema objects comprise columns in a data store having a tabular format, the returned metadata can include column names from those columns. A content-based data item classifier is configured to classify data items within the schema objects, based on content of those data items. This is discussed in further detail below.

Figure 5:
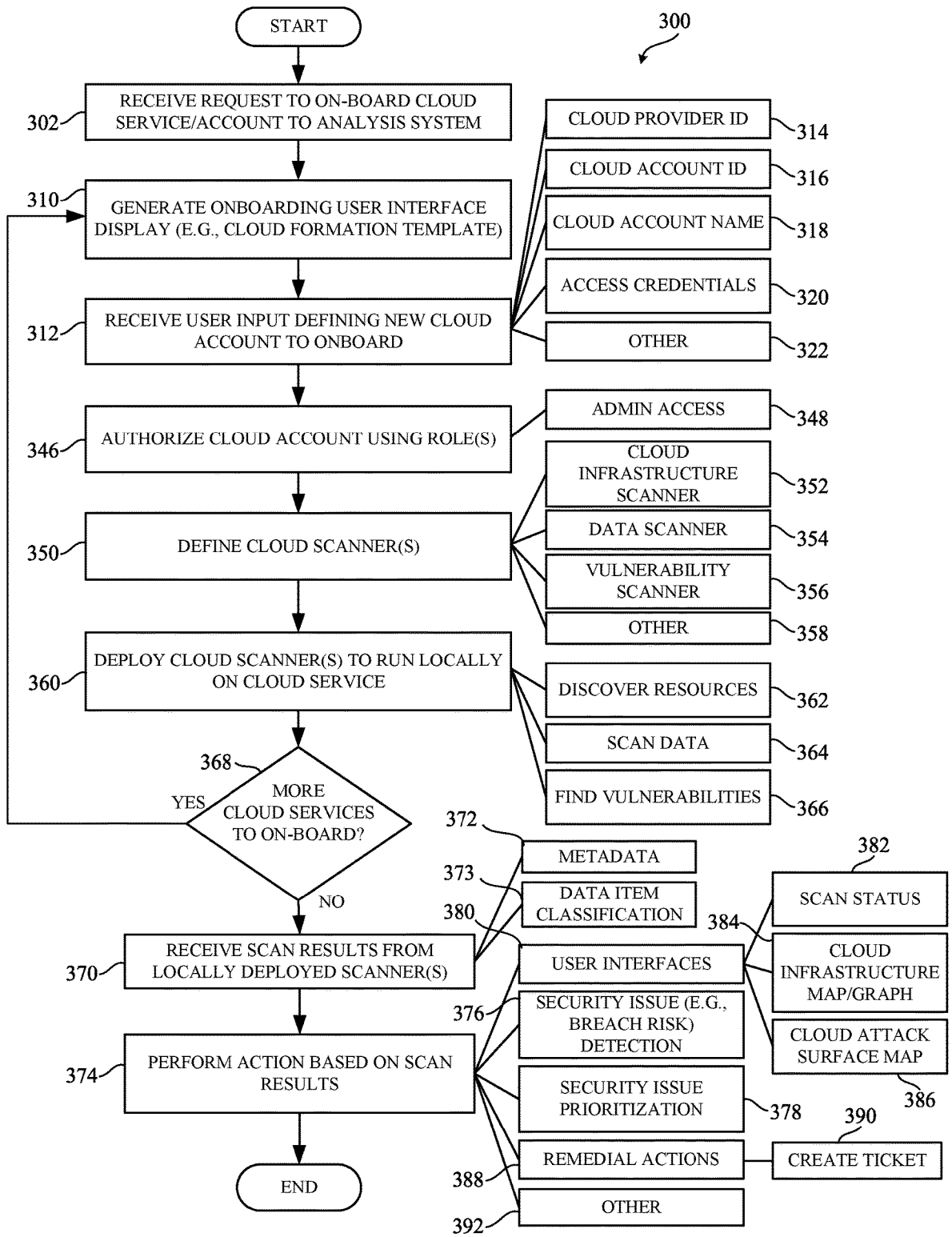
FIG. 5 is a flow diagram showing an example operation of on-boarding a cloud account and deploying one or more scanners.

FIG. 5 is a flow diagram 300 showing an example operation of system 122 in on-boarding a cloud account and deploying one or more scanners. At block 302, a request to on-board a cloud service to cloud security posture analysis system 122 is receives. For example, an administrator can submit a request to on-board cloud service 108-1.

FIG. 6 illustrates one example of a user interface display 304 provided for an administrator. Display 304 includes a display pane 306 including a number of display elements representing cloud accounts that have been on-boarded to system 122. Display 304 includes a user interface control 308 that can be actuated to submit an on-boarding request at block 302.

Referring again to FIG. 5, at block 310, an on-boarding user interface display is generated. At block 312, user input is received that defines a new cloud account to be on-boarded. The user input can define a cloud provider identification 314, a cloud account identification 316, a cloud account name 318, access credentials to the cloud account 320, and can include other input 322 defining the cloud account to be on-boarded.

FIG. 7 illustrates one example of an on-boarding user interface display 324 that is displayed in response to user actuation of control 308.

Display 324 includes a user interface mechanism 326 configured to receive input to select or otherwise define a particular cloud account provider. In the illustrated example, mechanism 326 includes a plurality of selectable controls representing different cloud providers including, but not limited to, AWS, GCP, Azure.

Display 324 includes a user input mechanism 328 configured to receive input defining a cloud account identifier, and an account nickname. User input mechanisms 330 allow the user to define other parameters for the on-boarding. A user input mechanism 332 is actuated to generate a cloud formation template, or other template, to be used in the on-boarding process based on the selected cloud account provider.

Once the cloud account is connected to system 122, display 304 in FIG. 6 can be updated to show the details of the cloud account as well as the scan status. In FIG. 6, each entry includes a display name 334, an account ID 336, a data store count 338, and a risk count 340. Data store count 338 includes an indication of the number of data stores in the cloud account and the risk count 340 includes an indication of a number if identified security risks. A field 342 indicates the last scan status, such as whether the last scan has completed or whether the scanner is currently in progress or currently scanning. A field 344 indicates the time at which the last scan was completed.

Referring again to FIG. 5, at block 346, the cloud account is authorized using roles. For example, administrator access (block 348) can be defined for the cloud scanner using IAM roles. One or more cloud scanners are defined at block 350 and can include, but are not limited to, cloud infrastructure scanners 352, cloud data scanners 354, vulnerability scanners 356, or other scanners 358.

At block 360, the cloud scanners are deployed to run locally on the cloud service, such as illustrated in FIG. 2. The cloud scanners discover resources at block 362, scan data in the resources at block 364, and can find vulnerabilities at block 366. As discussed in further detail below, a vulnerability can identified based on finding a predefined risk signature in the cloud service resources. The risk signatures can be queried upon, and define expected behavior within the cloud service and locate anomalies based on this data.

At block 368, if more cloud services are to be on-boarded, operation returns to block 310. At block 370, the scan results from the deployed scanners are received. As noted above, the scan results include metadata (block 372) and/or data item classifications (block 373) generated by the scanners running locally on the cloud service.

At block 374, one or more actions are performed based on the scan results. At block 376, the action includes security issue detection. For example, a breach risk on a particular resource (such as a storage resource storing sensitive data) is identified. At block 378, security issue prioritization can be performed to prioritize the detected security issues. Examples of security issue detection and prioritization are discussed in further detail below. Briefly, security issues can be detected by executing a query against the scan results using vulnerability or risk signatures. The risk signatures identify criterion such as accessibility of the resources, access and/or permissions between resources, and data types in accessed data stores. Further, each risk signature can be scored and prioritized based impact. For example, a risk signature can include weights indicative of likelihood of occurrence of a breach and impact if the breach occurs.

The action can further include providing user interfaces at block 380 that indicate the scan status (block 382), a cloud infrastructure representation (such as a map or graph) (block 384), and/or a cloud attack surface representation (map or graph) (block 386). The cloud attack surface representation can visualize vulnerabilities.

Remedial actions can be taken at block 388, such as creating a ticket (block 390) for a developer or other user to address the security issues. Of course, other actions can be taken at block 392. For instance, the system can make adjustments to cloud account settings/configurations to address/remedy the security issues.

Figure 8:
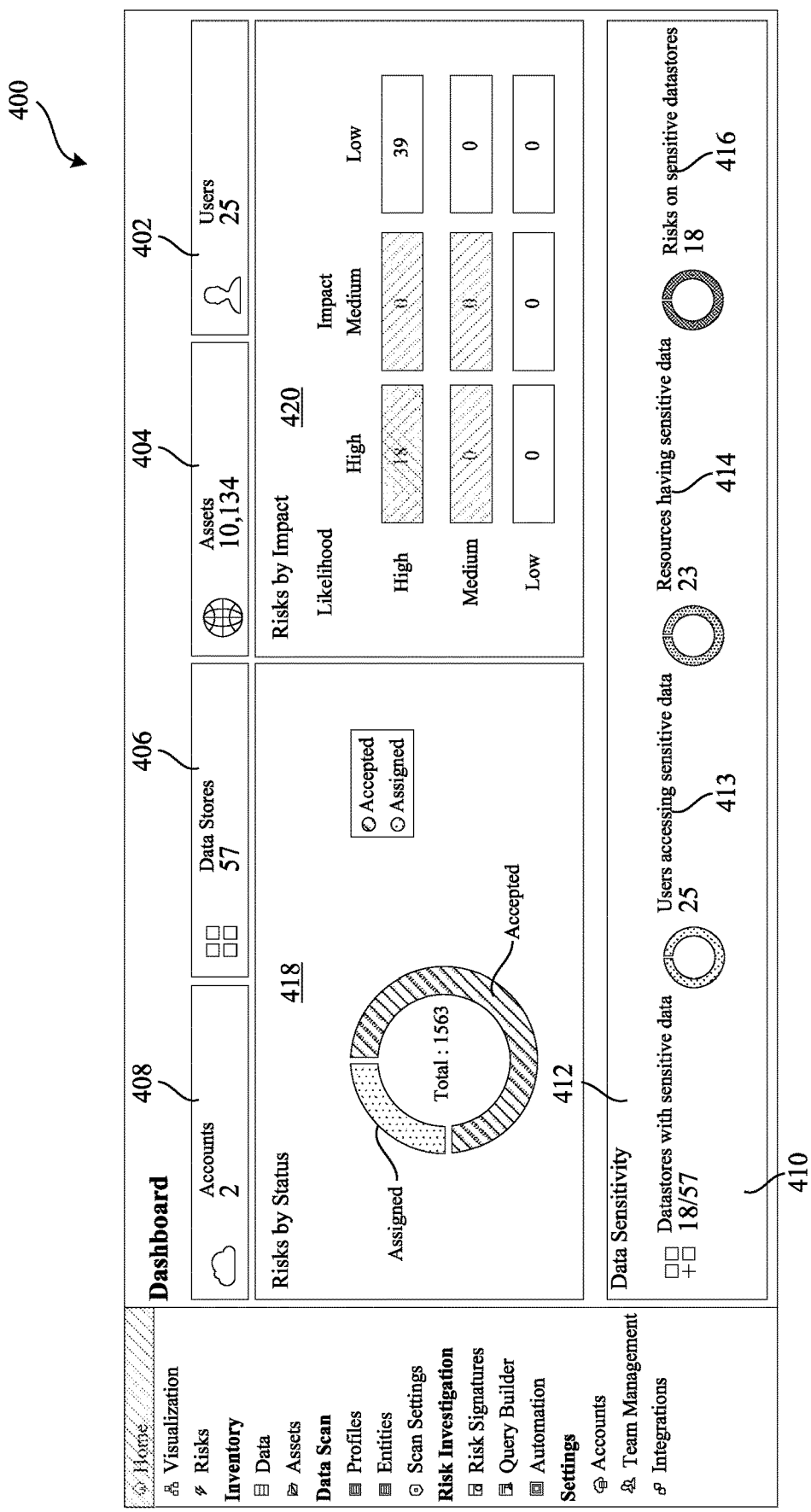
FIG. 8 illustrates one example of a user interface display having a dashboard representing on-boarded cloud service accounts.

FIG. 8 illustrates one example of a user interface display 400, that can be displayed at block 376. Display 400 provides a dashboard for a user which provides an overview of on-boarded cloud service accounts. The dashboard identifies a number of users 402, a number of assets 404, a number of data stores 406, and a number of accounts 408. A data sensitivity pane 410 includes a display element 412 that identifies a number of the data stores that include sensitive data, a display element 413 that identifies a number of users with access to the sensitive data, a display element 414 that identifies a number of resources having sensitive data, and a display element 416 that identifies a number of risks on the data stores having sensitive data. Further, graphs or charts can be generated to identify those risks based on factors such as status (display element 418) or impact (display element 420).

Display element 420 illustratively categorizes the risks based on impact as well as the likelihood of occurrence of those risks. Risk categorization is discussed in further detail below. Briefly, however, display element 420 stratifies one or more of breach likelihood scores or breach impact scores categories representing different levels of severity, such as high, medium, and low severity levels. In one example, display element 420 is color coded based on the degree of impact of the risk (e.g., high impact is highlighted in red, medium impact is highlighted in yellow, and low impact is highlighted in green).

Figure 9:
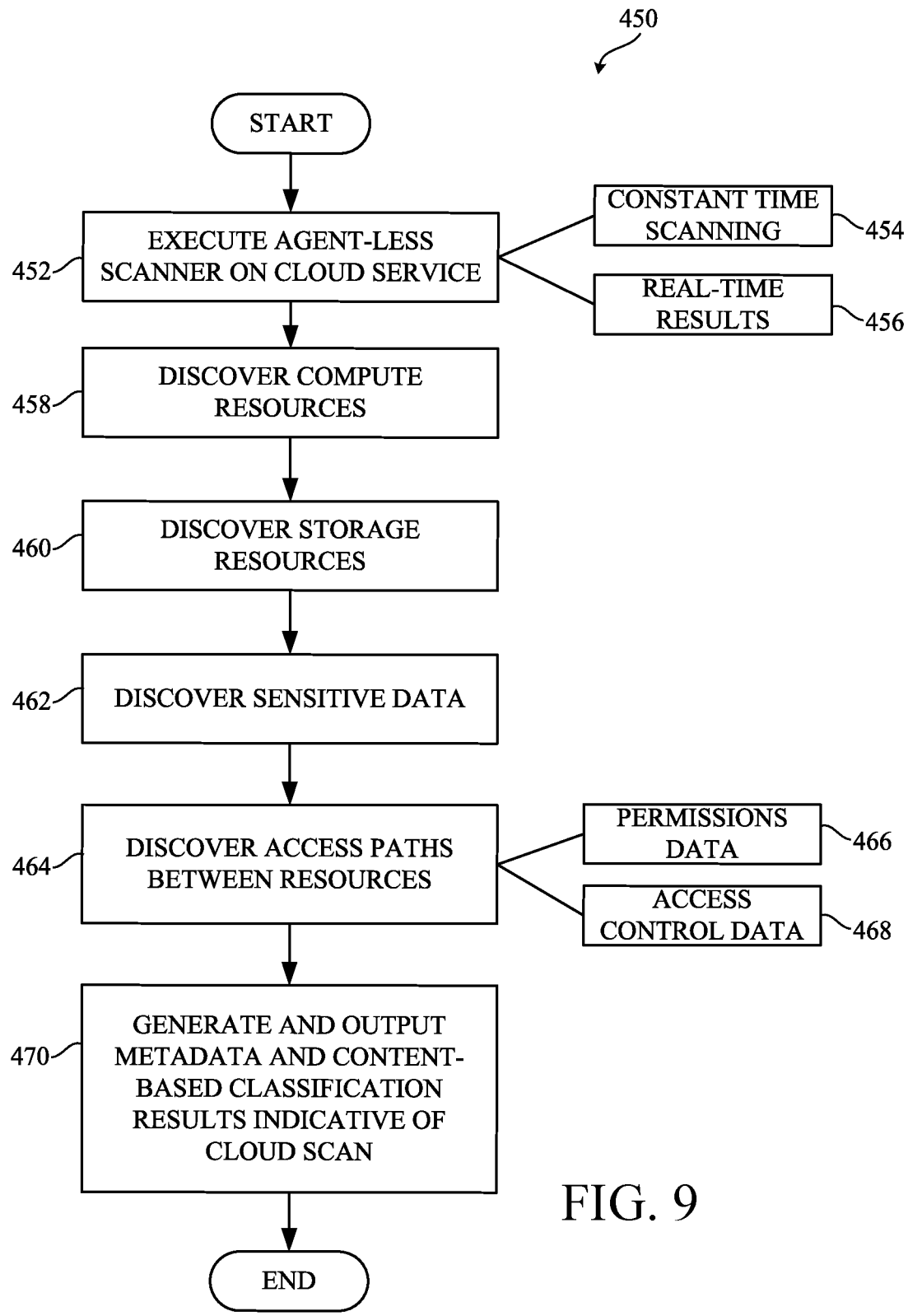
FIG. 9 is a flow diagram illustrating one example of cloud infrastructure scanning performed by a cloud scanner deployed in a cloud service.
Figures 1, 10:
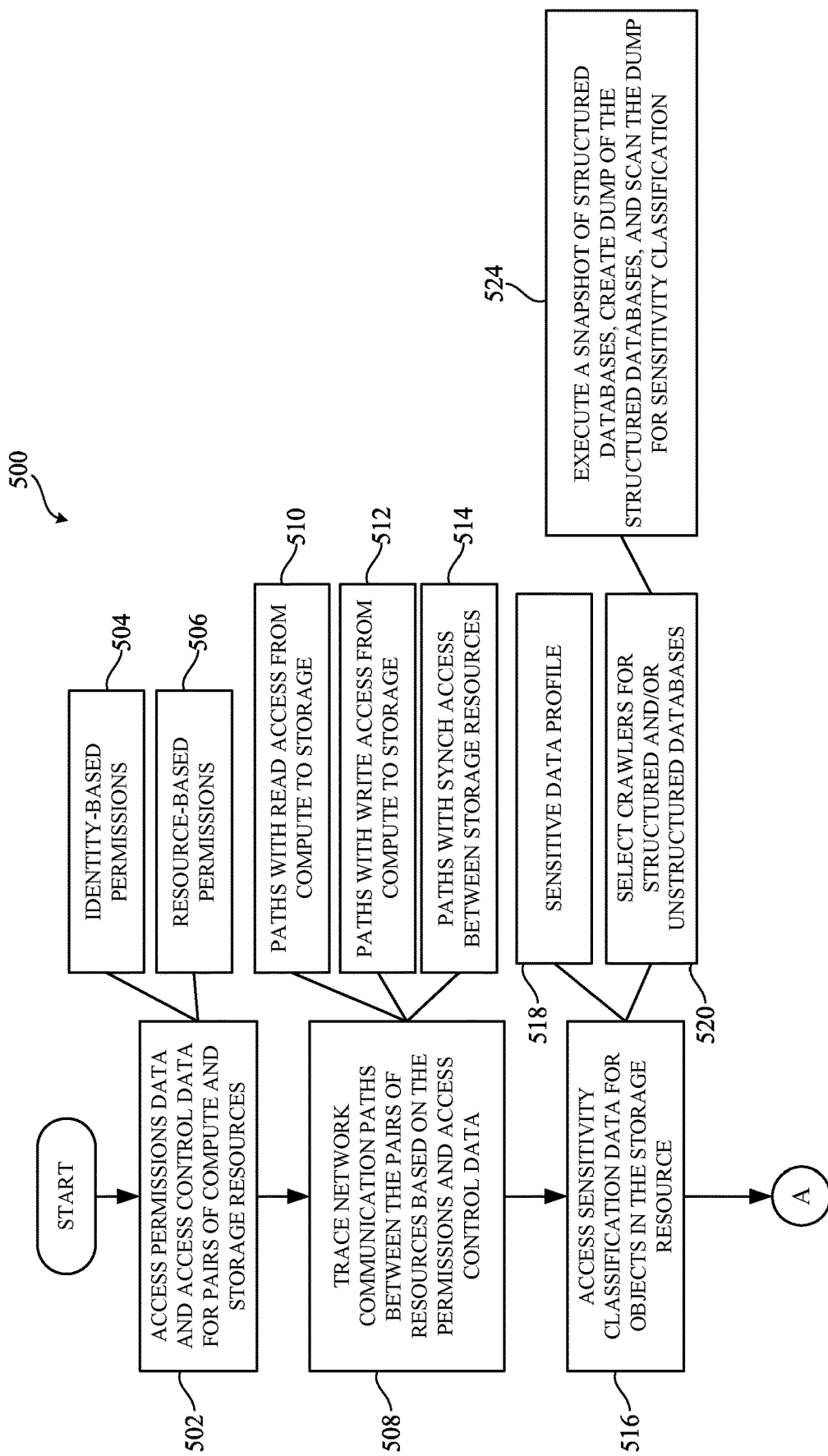
Figures 2, 10:
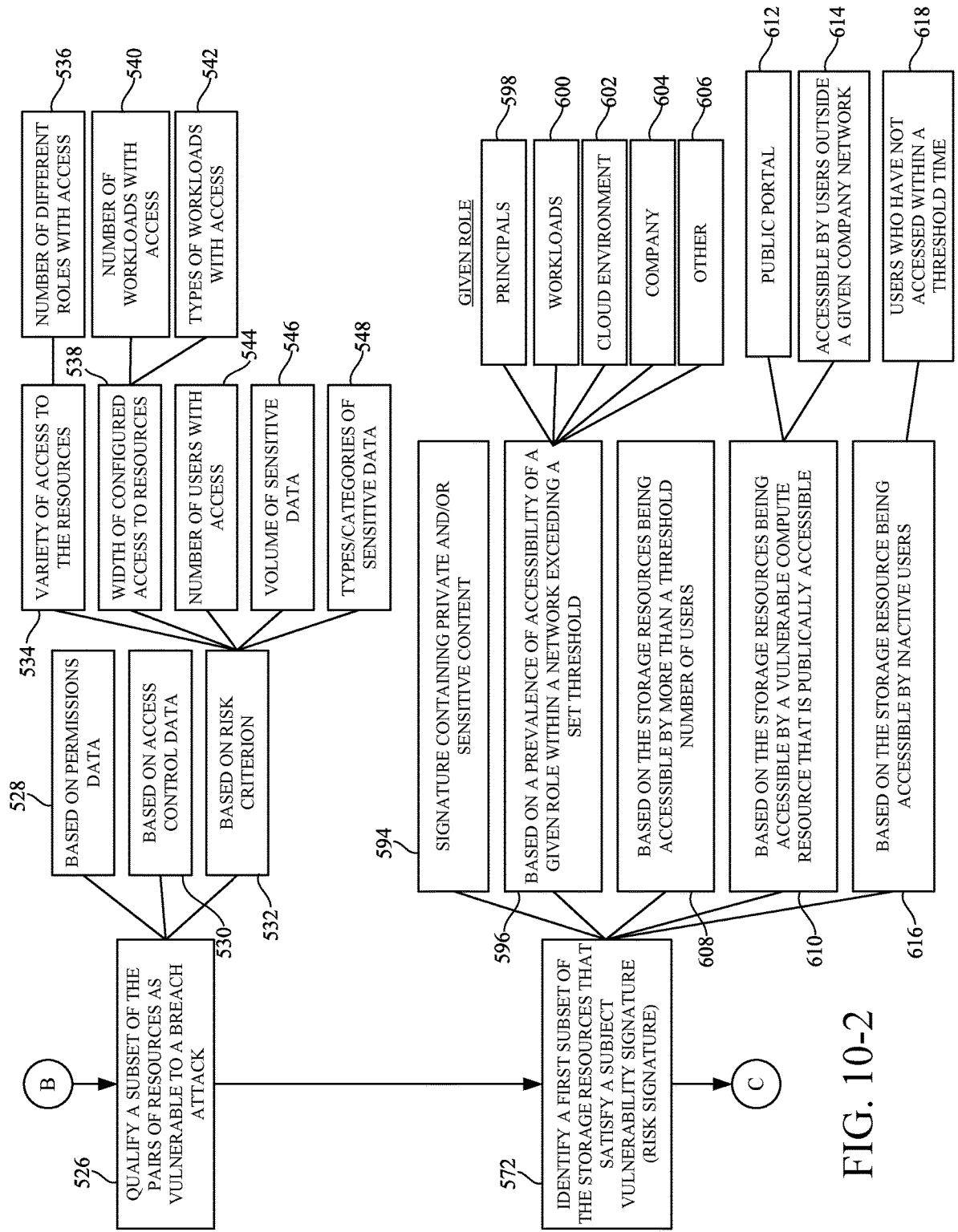
Figures 3, 10:
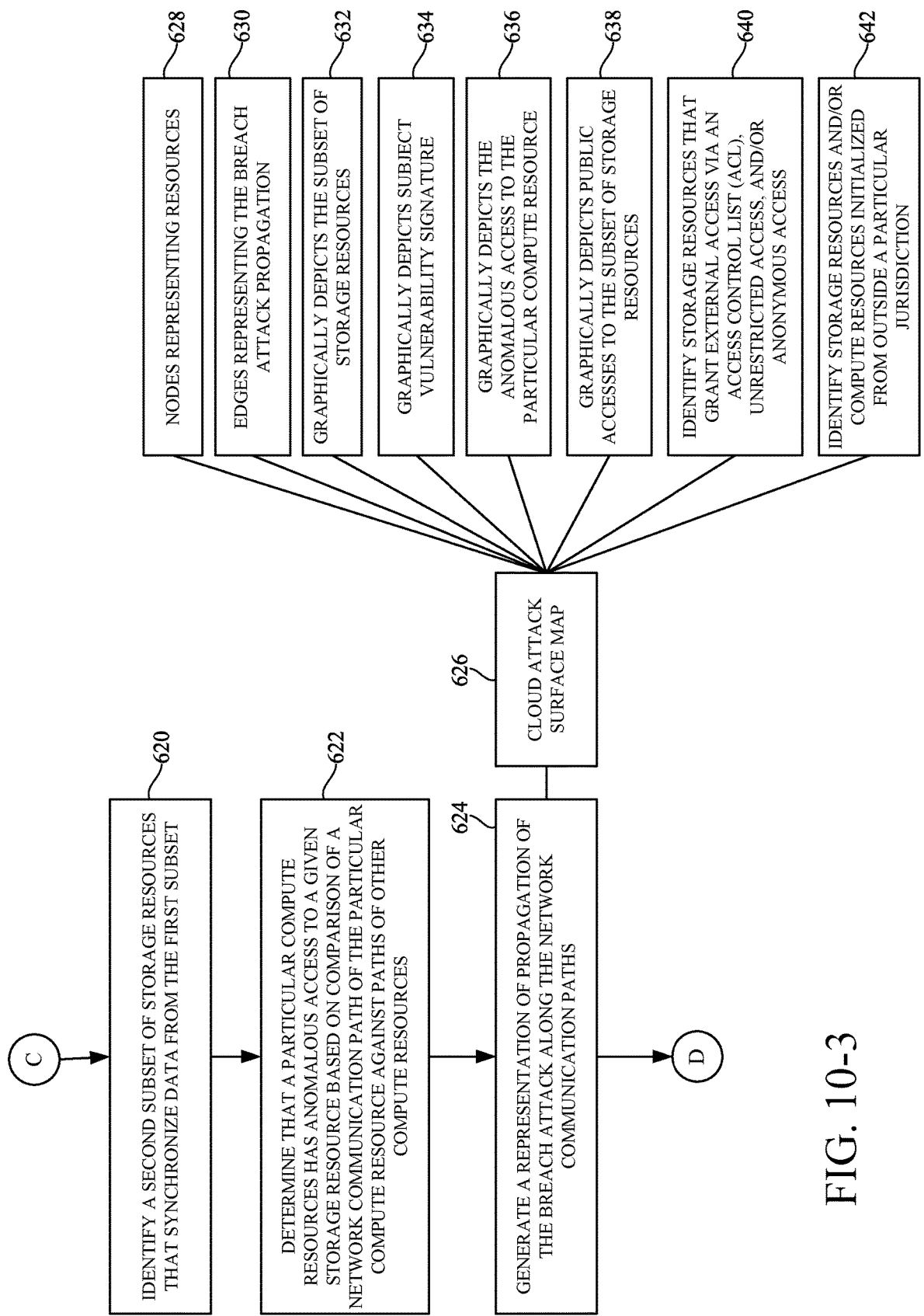
Figures 4, 10:
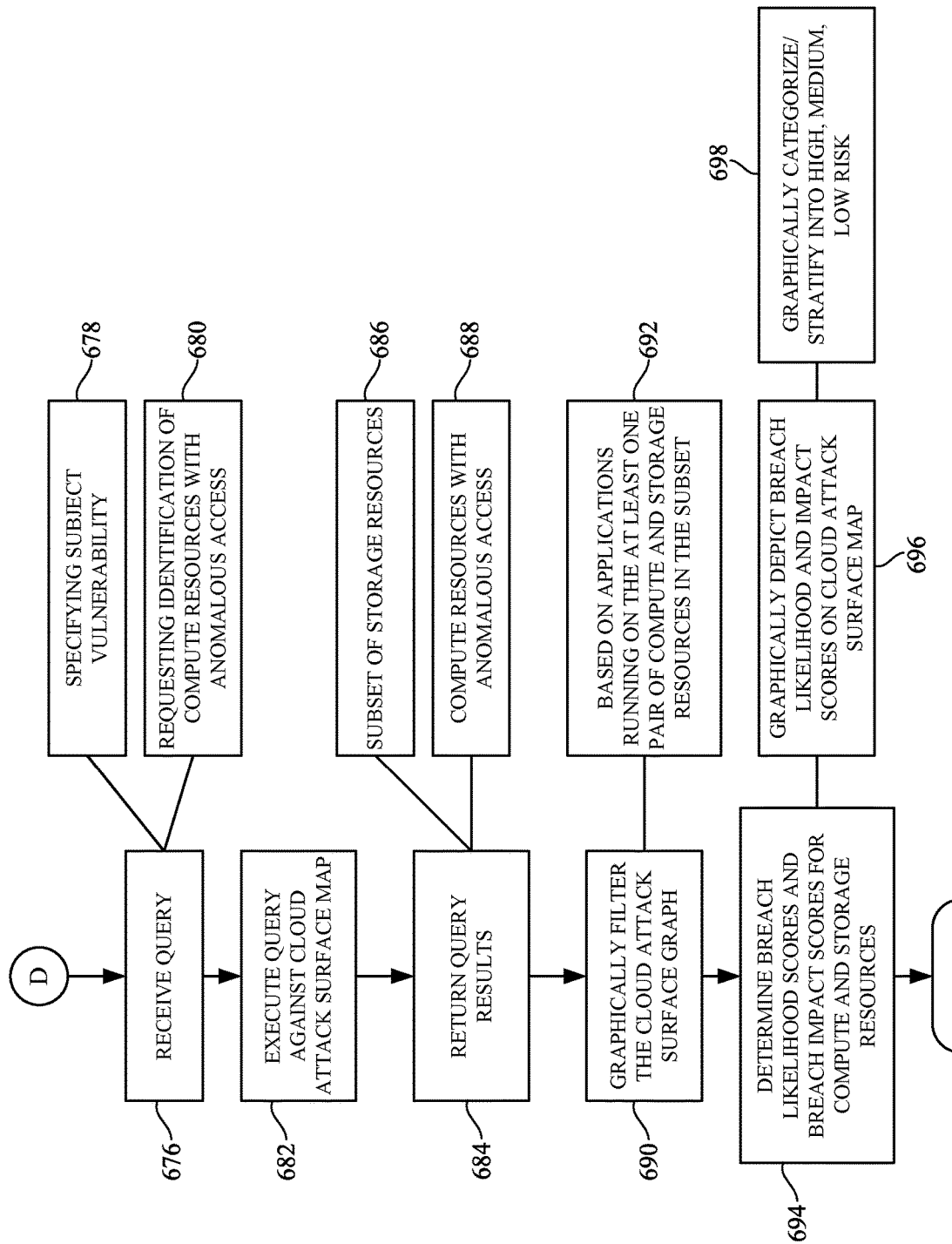

FIG. 9 is a flow diagram 450 illustrating one example of cloud infrastructure scanning performed by cloud scanner 148 deployed in cloud service 108-1. At block 452, an agent-less scanner is executed on the cloud service. The scanner can perform constant time scanning at block 454.

An example constant time scanner runs an algorithm in which the running time does not depend, or has little dependence on, the size of the input. The scanner obtains a stream of bytes and looks for a multiplicity of patterns (one hundred patterns, two hundred patterns, three hundred patterns, etc.) in one pass through the stream of bytes, with the same or substantially similar performance.

Further, the scanner can return real-time results at block 456. Accordingly, cloud security posture analysis system 122 receives updates to the security posture data as changes are made to the cloud services.

At block 458, the scanner discovers the compute resources 130 and, at block 460, the storage resources 132. Sensitive data can be discovered at block 462. The agent-less scanner does not require a proxy or agent running in the cloud service, and can utilize server-less containers and resources to scan the documents and detect sensitive data. The data can be accessed using APIs associated with the scanners. The sensitive data can be identified using pattern matching, such as by querying the data using predefined risk signatures.

At block 464, access paths between the resources are discovered based on permissions data 136 (block 466), and/or access control data 138 (block 468). A rule processing engine, such as using JSON metadata, can be utilized to analyze the roles and policies, and can build access relationships between the nodes representing the resources. The policies can be decoded to get access type (allow, deny, etc.) and the policy can be placed in a node to link from a source to target node and create the access relationship. At block 470, metadata and/or content-based classification results indicative of the scanning is generated and outputted by output component 272.

FIGS. 10-1, 10-2, 10-3, and 10-4 (collectively referred to as FIG. 10) provide a flow diagram 500 illustrating an example operation for streamlined analysis of security posture. For sake of illustration, but not by limitation, FIG. 10 will be discussed in the context of cloud security posture analysis system 122 illustrated in FIG. 3. Security posture can be analyzed by system 206 using metadata 252 to return from the cloud service scanners.

At block 502, permissions data and access control data are accessed for pairs of compute and storage resources. The permissions and access control data can include identity-based permissions at block 504, resource-based permissions at block 506, or other permissions as well.

At block 508, network communication paths between the pairs of resources are traced based on the permissions and access control data. For example, the permissions and access control data can identify which paths have read access from a compute resource from a particular compute resource to a particular storage resource, as represented at block 510. Similarly, paths with write access from compute to storage resources can be identified at block 512, paths with synchronization access between storage resources can be identified at block 514. Of course, other types of paths can be identified as well.

For sake of example, but not by limitation, a directional graph is constructed to captures all resources as nodes, with labels assigned to the nodes for search and retrieval. In the AWS example, labels can mark a node as a database or S3 resource. Similarly, labels can represent actors as normal users, admins, developers, etc. Then, known relationships are identified between the nodes, for example using the information available from the cloud infrastructure configuration (e.g., defining a resource belongs to a given account). Similarly, a relationship can be created between the policy attached to a resource, and/or the roles that can be taken up by a user. In addition to storing static information, a rule processing engine (e.g., using JavaScript Object Notation (JSON) metadata) to analyze the roles and policies and build the "access" relationship between the nodes. The analysis can be used to decode the policy to get the access type (e.g., allow, deny, etc.), and the placement of the policy in a node can be used to link from the source node to target node and create the access relationship (e.g., allow, deny, etc.). Similarly, role definitions can be analyzed to find the access type. The graph can therefore include various types of nodes, updated to reflect direct relationships.

An iterative process can be performed to find transitive relationships between resources (e.g., resource access for a given entity/actors/resources). In one example, for each access relationship from a first node N1 to a second node N2, the process identifies all incoming access relationships of N1. Then, the access types targeting node N1 are analyzed and updated. Using the relationships identified to access N1, the relationships to N2 are updated, and a new set of access relationships are identified to N2 through N1. The process continues to proceed to identify all such relationships with the goal of creating relationships to all nodes that have sensitive data.

In one example, block 508 identifies "access types" which include normalized forms of access permissions. For example, an access type "can read" can be defined to include a plurality of different read objects within AWS (e.g., defined in terms of allowable APIs). Similarly, the AWS permissions "PutObject" and "PutObjectAcl" are transformed to a normalized access type "can write" within system 122.

At block 516, sensitivity classification data is accessed for objects in the storage resources. The sensitivity classification data can include sensitive data profiles at block 518.

At block 520, crawlers can be selected for structured and/or unstructured databases. Crawling the databases can include executing a snapshot of structured databases, creating a dump of structured databases, and scanning the dump for sensitivity classification, as represented at block 524.

At block 526, a subset of the pairs of resources are qualified as vulnerable to a breach attack. The qualification can be based on the permissions data at block 528, the access control data at block 530, and/or risk criterion at block 532. The risk criterion can include any of a wide variety of different types of criteria. For example, a risk criterion can indicate a variety of access to the resources at block 534. One example includes a number of different roles with access to the resource, as represented at block 536.

Also, a risk criterion can indicate a width of configured access to the resources, at block 538. For example, the width of configured can include a number of workloads with access to the resources (block 540) and/or a type of workload with access to the resources (block 542).

A risk criterion can also indicate a number of users with access to the resources at block 544, a volume of sensitive data in the resources at block 546, and/or types of categories of sensitive data at block 548. Of course, other types of risk criterion can be utilized as well.

Figure 11:
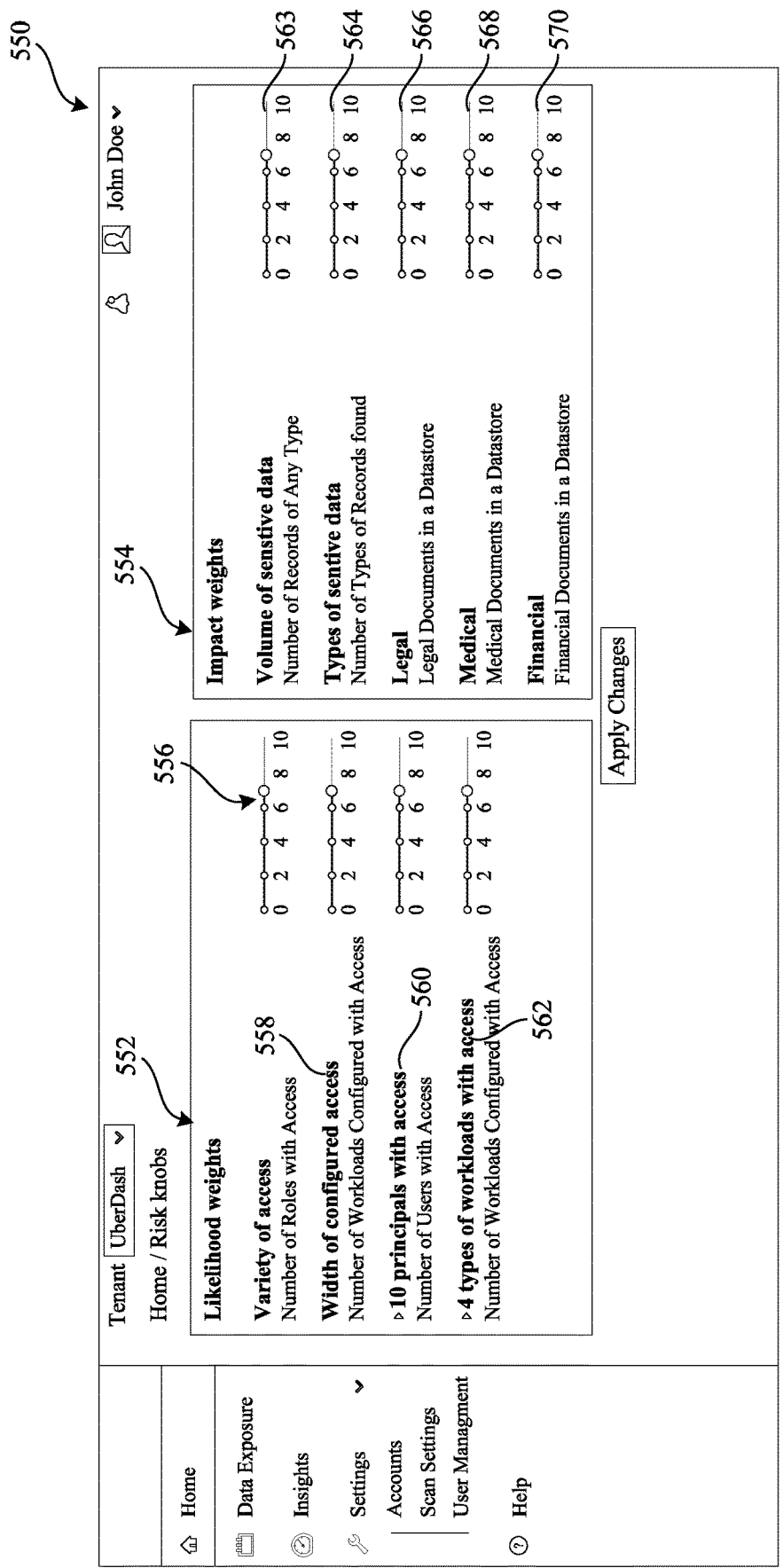
FIG. 11 illustrates one example of a user interface display that facilitates user definition of a risk criterion.

In one example, the risk criterion can be defined based on user input. FIG. 11 illustrates one example of a user interface display 550 that facilitates user definition of risk criterion. Display 550 includes a set of user input mechanisms that allows a user to define likelihood weights, represented at numeral 552, and impact weights, represented at 554.

For sake of illustration, a first user input mechanism 556 allows a user to set a weight that influences a likelihood score for variations in the variety of access to the resources (e.g., block 534). Similarly, controls 558, 560, and 562 allow a user to set weights that influence likelihood scores for a width of configured access, a number of principles or users with access, and the type of workloads with access, represented by reference numerals 558, 560, and 562, respectively.

Similarly, controls 563, 564, 566, 568, and 570, allow a user to set weights on impact scores for risk criterion associated with a volume of sensitive data, a type of sensitive data, and categories of sensitive data (i.e., legal data, medical data, financial data), respectively.

Referring again to FIG. 10, at block 572, a first subset of the storage resources that satisfy a subject vulnerability signature are identified. A subject vulnerability signature illustratively includes a risk signature indicative of a risk of vulnerability or breach.

FIG. 12 illustrates an example user interface display 574 that can be accessed from display 304 illustrated in FIG. 6, and displays a set of risk signatures. The risk signatures can be predefined and/or user-defined. For example, display 574 can include user input mechanisms that allow a user to add, delete, or modify a set of risk signatures 576. As noted above, each risk signature defines a set of criteria that the resources and data in cloud service 108-1 can be queries upon to identify indications of vulnerabilities in the cloud service. The risk signatures in FIG. 12 include a name field 578, a unique risk signature ID field 580, and a description identified in a description field 582. A result header field 584 identifies types of data that will be provided in the results when the risk signature is matched. A resource field 586 identifies the type of resource, and a tags field 588 identifies tags that label or otherwise identify the risk signature. Additionally, a likelihood factor field 590 indicates a likelihood factor that is assigned to the risk signature and an impact factor signature 592 indicates an impact factor assigned to the risk signature. The likelihood factor indicates a likelihood assigned to occurrence of the risk signature and the impact factor assigns an impact to the cloud service assigned to the occurrence of the risk signature. For sake of illustration, a likelihood factor of ten (out of a scale of ten) indicates that the vulnerability is likely to occur if the risk signature is identified in the cloud posture data, whereas a likelihood factor of one indicates a low likelihood. Similarly, an impact factor of ten (out of a scale of ten) indicates that the vulnerability is considered to have a high impact, whereas an impact factor of one indicates the vulnerability is considered to have a low impact on the cloud service.

A risk signature can be defined based upon any of a wide variety of criteria. For example, a risk signature can identify one or more configurations or settings of compute resources 130. Examples include, but are not limited to, a configuration that indicates whether the compute resource provides accessibility to a particular type of data, such as confidential data, medical data, financial data, personal data, or any other type of private and/or sensitive content. In another example, a risk signature indicates that a compute resource is publicly accessible, includes a public Internet protocol (IP) address, or has IP forwarding enabled. In another example, a risk signature indicates that a compute resource has monitoring disabled, has no IAM role assigned to the compute resource, has backup disabled, data encryption disabled, and/or a low or short backup retention policy. Also, a risk signature can identify password policies set for the compute resource. For instance, a risk signature can indicate a lack of minimum password policies, such as no minimum password length, no requirement of symbols, lowercase letters, uppercase letters, numbers, or password reuse policy. Also, a risk criterion can indicate a location of the compute resource, such as whether the compute resource is located outside of a particular region.

Risk signatures can also indicate configurations and/or settings of storage resources 132. For example, the configurations and settings can indicate authentication or permissions enforced by the storage resource, such as whether authentication is required for read, write, delete, synchronization, or any other operation. Also, the risk signature can indicate whether multi-factor authentication is disabled for the storage resource, as well as a breadth of permissions grants (e.g., whether all authenticated users are granted permissions within the storage resource). Also, a risk signature can indicate whether encryption is enabled by default, a password policy enforced by the storage resource, whether the storage resource is anonymously accessible, publicly accessible, has a key management service disabled, has logging disabled, life cycle management disabled, whether the storage resource is utilized for website hosting, has geo-restriction disabled, or has backup functionality disabled. Also, the risk signature can indicate a type of data stored by the storage resource, such as the examples discussed above.

Referring again to FIG. 10, the first subset of storage resources identified at block 572, are based on determining that the storage resources satisfy a risk signature of containing private and/or sensitive content, as represented at block 594. In another example, the subject vulnerability signature is based on a prevalence of accessibility of a given role within a network exceeding a set threshold, as represented at block 596. For instance, the given role can include principles (block 598), workloads (block 600), a cloud environment (block 602), a company (block 604), or other roles (block 606).

Also, the subject vulnerability signature can indicate that the storage resources are accessible by more than a threshold number of users, as represented at block 608. Also, the subject vulnerability signature can indicate that the storage resources are accessible by a vulnerable compute resource that is publicly accessible, as represented at block 610. This determination can be based on identifying that the compute resource is accessible through a public portal, at block 612 and/or is accessible by users outside a given company network at block 614.

As represented at block 616, the subject vulnerability signature can indicate that the storage resources are accessible by inactive users. For example, inactive users can include users who have not accessed the resources within a threshold time, at block 618.

At block 620, a second subset of storage resources are identified that synchronization data from the first subset. At block 622, a particular compute resource is determined to have anomalous access to a given storage resource. The identification of anomalous access can be based on a comparison of a network communication path of the particular compute resource against paths of other compute resources. For example, the paths of other compute resources can be used to identify an expected communication path for the particular compute resource and/or expected permission for the particular resource. Then, if a difference above a threshold is identified, the particular compute resource is identified as anomalous.

At block 624, a representation of the propagation of the breach attack along the network communication paths is generated. In one example, the representation includes a cloud attack surface map, as represented at block 626. An example cloud attack surface map includes nodes representing the resources (block 628) and edges representing the breach attack propagation (block 630). The map graphically depicts the subset of storage resources (block 632) and the subject vulnerability signature (block 634). Also, the map can graphically depict the anomalous access to the particular compute resource (block 636). For example, public accesses to the subset of storage resources can be graphically depicted at block 638 and storage resources that grant external access and/or resources that are initialized from outside a particular jurisdiction can be identified at blocks 640 and 642, respectively.

FIG. 13 illustrates one example of a user interface display 650 that graphically depicts vulnerability risks, in tabular form. In one example, display 650 renders the data discussed with respect to the cloud attack surface at block 626 of FIG. 10 in a table.

Figure 14:
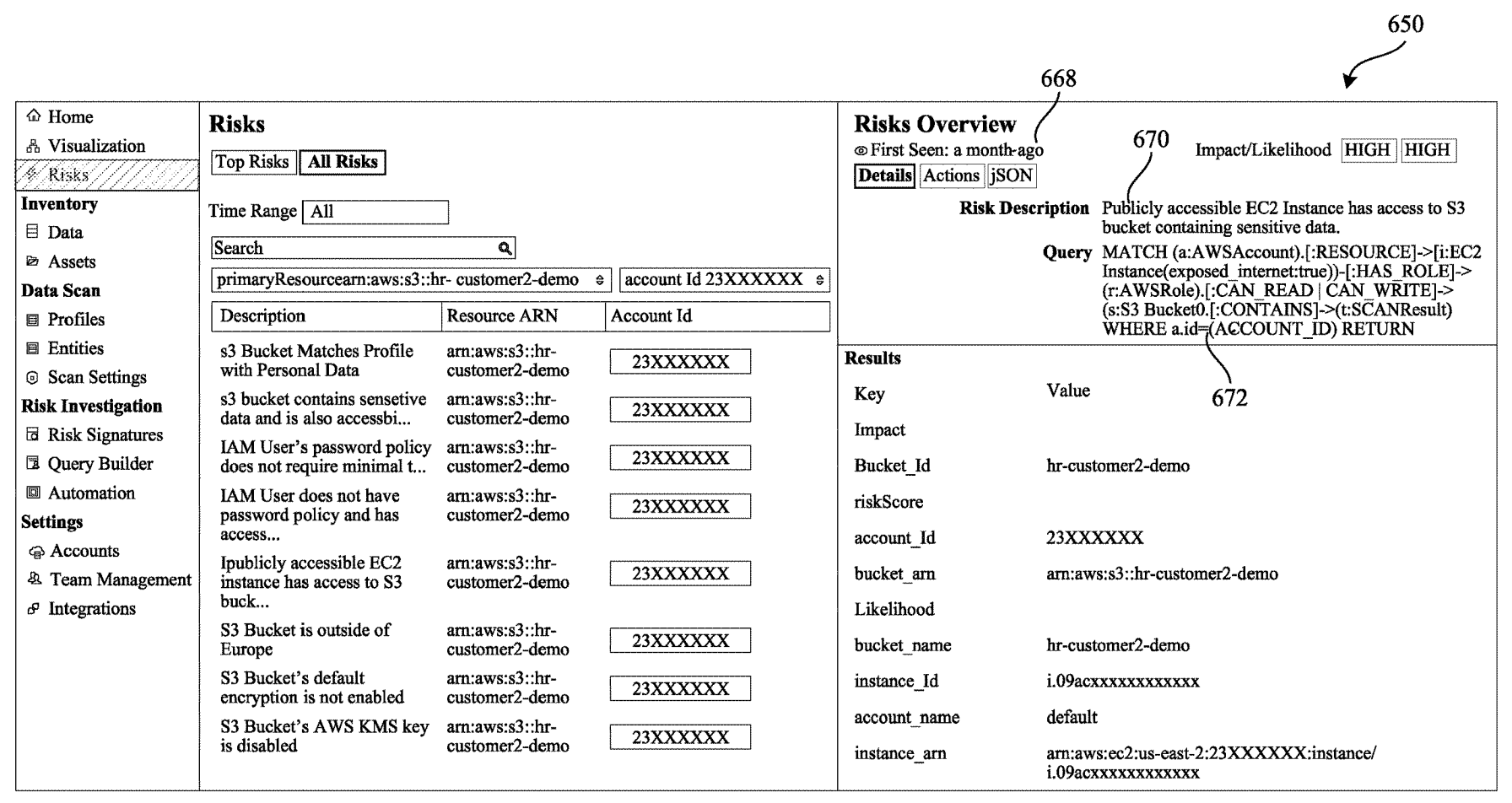

Display 650 includes a user input mechanism 652 to specify a time range for visualizing the risk, and includes a description 654, a resource identifier 656, and an account identifier 658 for the cloud service account. The display can also indicate the impact 660 and likelihood 662 of the vulnerability risk, as well as signature identifier 664 that identifies the particular risk signature that was matched. Display 650 also includes a details control 666 that is actuatable to display details of the identified risk. One example of a details display pane 668 is illustrated in FIG. 14. Display pane 668 shows a description of the risk at display element 670 and an indication 672 of the query utilized to match the risk signature.

Referring again to FIG. 10, at block 676, a query is received for execution against the results of the metadata analysis. For example, a query can specify a subject vulnerability at block 678 and/or the query can request identification of resources with anomalous access at block 680.

At block 682, the query is executed against the cloud attack surface map. For example, the cloud attack surface map can be filtered to identify results that match the query. The query results (e.g., the filtered map) is returned at block 684. The filtered results can include identifying a subset of storage resources that match the query (block 686) and/or resources having anomalous access at block 688.

The cloud attack surface graph is graphically filtered based on the results at block 690. For example, the graph can be filtered based on applications running on the pairs of resources in the identified subset (block 692). Breach likelihood scores and breach impact scores are determined for the resources at block 694, and the scores can be depicted on the cloud attack surface map at block 696. In one example, the scores are graphically categorized or stratified at block 698 into high, medium, or low risk. One example is discussed above with respect to FIG. 8.

Figure 16:
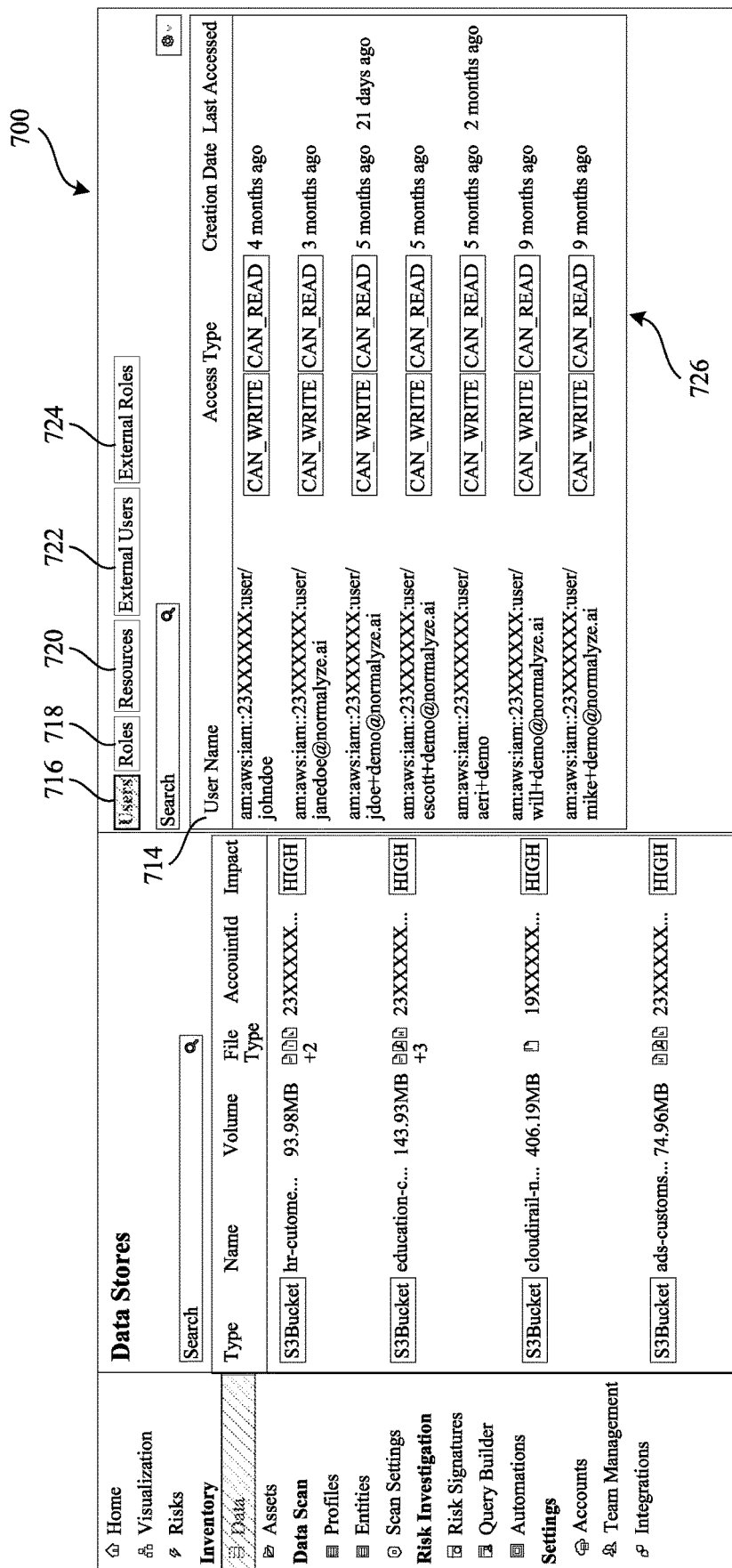
FIG. 16 illustrates one example of a user interface display having a details pane that displays details for a given resource.

FIG. 15 illustrates one example of a user interface display 700 configured to graphically depict breach likelihood and impact scores. Display 700 identifies data stores in storage resources 132 that are identified as meeting a subject vulnerability. Each entry in display 700 identifies a type 702 of the resource, an impact score 704, a likelihood score 706, a resource identifier 708 that identifies the resource, and a cloud service identifier 710 that identifies the particular cloud resource. Based on actuation of a risk item view generator mechanism 712, display 700 shows details for the given resource in a details display pane 714, as shown in FIG. 16. Details display pane 714 can show users 716 that have access to the resource, roles 718 that have access to the resource, other resources 720 that have access to the resource, as well as external users 722 or external roles 724. Details display pane 714 also shows the access type 726.

Figure 17:
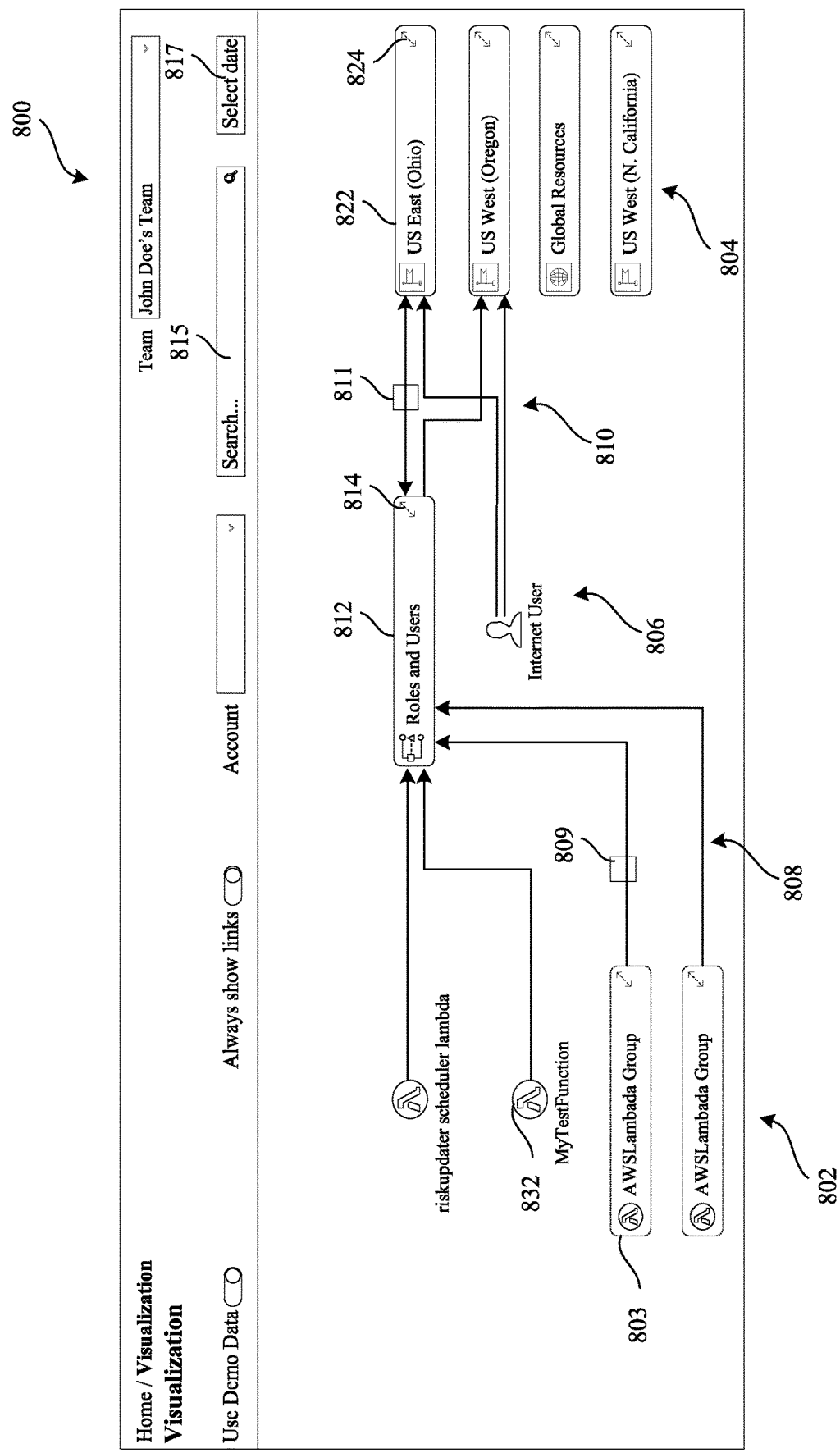
FIG. 17 illustrates a user interface display that includes a visualization of access communication paths.

FIG. 17 illustrates a user interface display 800 that includes a visualization of access communication paths. The visualization in FIG. 17 can be rendered as a cloud infrastructure graph (e.g., map) that shows relationships between compute and storage resources and/or mappings between users, roles, and resources, based on the permissions data and the access control data. Further, the visualization can be augmented using sensitivity classification data to represent propagation of breach attack along communication paths. For example, the visualization in FIG. 17 can be configured to render the subset(s) of resources identified in FIG. 10. That is, display 800 can include the cloud attack surface map at block 626.

As shown in FIG. 17, nodes 802 represent compute resources and nodes 804 represent storage resources. Illustratively, the storage resources include data stores or buckets within a particular cloud service. Nodes 806 represent roles and/or users. The links (e.g., access paths) or edges 808 between nodes 802 and 806 represent that compute resources that can access the particular roles represented by nodes 806. The edges or links 810 represent the storage resources that can be accessed by the particular roles or users represented by nodes 806.

Based on these relationships between compute and storage relationships, display elements can be rendered along, or otherwise visually associated with, the edges 808 and/or 810, to identify and graphically depict the propagation of breach attack. For instance, vulnerability display elements can be rendered in association with edges 808 and/or 810 to identify that a subject vulnerability signature (e.g., one or more risk signatures shown in FIG. 12) has been identified in the data, based on querying the permissions and access control data using the subject vulnerability signature. For example, display element 809 represents a risk signature between nodes 803 and 812 and display element 811 represents (such as by including a description, icon, label, etc.) a risk signature between nodes 812 and 822. Each display element 809, 811 can represent (such as by including a description, icon, label, etc.) corresponding likelihood and impact scores, can be actuatable to render details of the subject vulnerability, such as in a display pane on display 800. The details can include which risk signature has been matched, which sensitive data is at risk, etc.

The graph can be interactive at a plurality of different resolutions or levels. For example, a user can interact with the graph to zoom into a specific subset, e.g., based on cloud vendor concepts of proximity (regions, virtual private clouds (VPCs), subnets, etc.). Node 812 includes an expand actuator 814 that is actuatable to expand the display to show additional details of the roles, role groups, and/or users represented by node 812.

When zooming into one region, such as when using the actuators discussed below, other regions can be zoomed out. This can be particularly advantageous when handling large diagrams. Further, the graph includes one or more filter mechanisms configured to filter the graph data by logical properties, such as names, values of various fields, IP addresses, etc. For example, a free form search box 815 is configured to receive search terms and filter out all resources (e.g., by removing display of those resources) except those resources matching the search terms. In one example, the search terms include a subject vulnerability signature (e.g., containing private and sensitive content, public accessibility, accessibility by a particular user and/or role, particular applications running on the resources, access types, etc.).

An input mechanism 817 is configured to receive a temporal filter or search criterion. For example, a filter criterion is entered by a user to represent at least one of a creation time or date of computer resources and storage resources. Further, a query can be entered specifying at least one temporal period, wherein the cloud infrastructure map is updated to graphically return at least one prior state (e.g., a permissions state, an access control state, and/or a sensitivity data classification state) of compute resources and storage resources based on the temporal period.

A checkbox (not shown in FIG. 17, and which can be global to the diagram) provides the ability to toggle whether or not direct neighbors of the matching resources are also displayed, even if those neighbors themselves don't match the search terms. This allows users to search for specific resources and immediately visualize all entities that have access to the searched resources. To illustrate, assume a search for personally identifiable information (PII) matches a set of S3 buckets. In this case, the graph renders resources that have access to that PII. Further, the graph can show associated data and metadata (e.g., properties extracted from cloud APIs, properties derived such as presence of sensitive data, access paths, etc.). This data and metadata can be shown on a panel to the left or right of the diagram. Further, user can actuate user interface controls to collapse/expand this panel. In one example, the panel remains collapsed or expanded until changed, even across different searches and login sessions. Additionally, the display can groups properties in related categories (e.g., summary, all metadata retrieved from the cloud, all metadata derived, local annotations, etc.), and the diagram can be filtered (such as by using the free form search bar mentioned above) by metadata such as tags, applications running on them, identified owners, time since created, etc.). The state of the resources can be shown as of a user defined date or time. A calendar component can allow users to select a particular date to visualize historical state data as of that particular date.

Referring again to FIG. 17, the nodes 804 representing the storage resources are also actuatable to show additional details. For example, node 822 includes an actuator 824 that is actuatable to display a view of the constituents of the storage resource represented by node 822. One or more of the elements are further actuatable to show additional details of the constituent.

Figure 18:
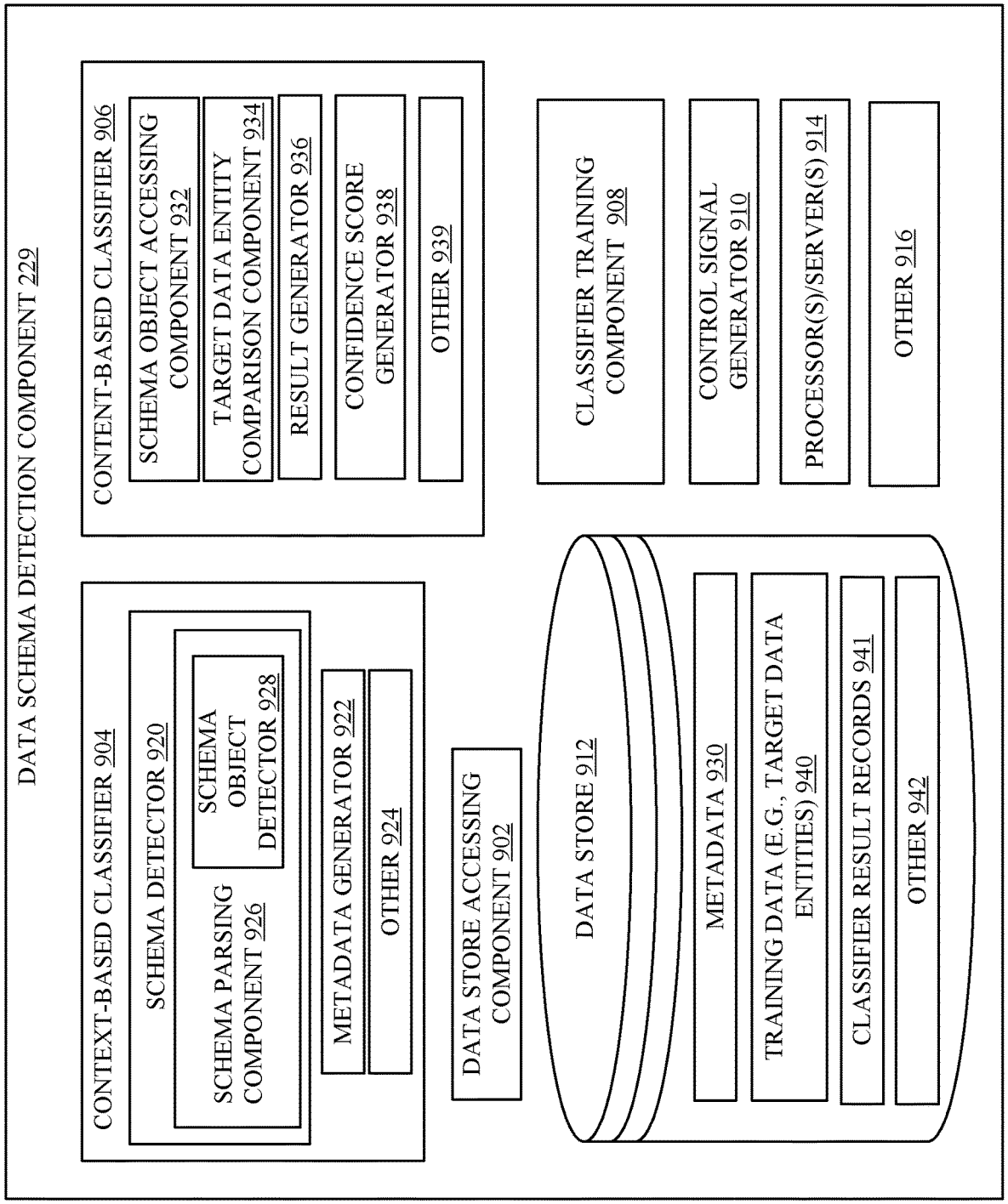
FIG. 18 is a block diagram illustrating one example of a data schema detection component.

FIG. 18 illustrates one example of data schema detection component 229. Component 229 includes a data store accessing component 902, a context-based classifier 904, a content-based classifier 906, a classifier training component 908, a control signal generator 910, a data store 912, one or more processors or servers 914, and can include other items 916 as well.

Data store accessing component 902 is configured to access data stores to be analyzed. Context-based classifier 904 includes a schema detector 920, a metadata generator 922, and can include other items 924 as well. Schema detector 920 is configured to detect a schema used by the data store, and includes a schema parsing component 926, which includes a schema object detector 928. For sake of illustration, but not by limitation, in an example structured database, the data stores store data according to a defined format, such as a table format, JavaScript object notation (JSON), to name a few. The data stores can be accessed using a database management system, such as mySQL, Mongo DB, to name a few. Thus, schema object detector 928 identifies the particular schema objects in the database structure and metadata generator 922 generates metadata that identifies the detected schema objects along with relationship data that identifies relationships between those schema objects. The metadata can be stored as metadata 930 in data store 912.

However, in some instance, the metadata can provide some level of context, but may not accurately represent the actual content items. For example, the returned metadata can include column names of columns in a tabular data store, but the column names may not accurately represent the actual data items in the corresponding columns. For instance, sensitive data, such as financial data, personal data, etc. can be stored in a column having a column name that identifies the column as including something other than sensitive data (e.g., a customer phone number can be stored in a product description column). In turn, data posture analysis performed using such metadata can be inaccurate and fail to identify potential data security vulnerabilities.

Content-based classifier 906 is configured to perform content-based classification to classify data items in the schema objects identified by context-based classifier 904. Content-based classifier 906 includes a schema object accessing component 932, a target data entity comparison component 934, a result generator 936, a confidence score generator 938, and can include other items 939 as well. Schema object accessing component 932 is configured to access the schema objects detected by schema object detector 928. For example, component 932 can identify and access columns in a table using the stored metadata 930.

Data store 912 can also store training data 940, classifier result records 941, and can store other items 942 as well. Training data 940 illustratively includes target data profiles (also referred to as target data profiles or entities 940) that represent a collection of different data types to be used in performing the content-based classification. For example, training data 940 can include sensitive data profiles 254, which can represent sensitive data types, patterns, and/or signatures. Examples include various types of financial data, such as, but not limited to, credit card numbers, bank account numbers, etc. Also, the training data 940 can identify personal information, such as social security numbers, phone numbers, email addresses, etc.

For sake of illustration, but not by limitation, an example target data profile for an internet protocol (IP) address indicates a form "x.x.x.x", where x is an octet and must be a decimal value between zero and two hundred and fifty five. As another example, a target data profile for a credit card number indicates a string of fifteen or sixteen characters that begins with a three, four, or five.

Training data 940 be stored, updated, and removed in any of a number of ways. For example, a user can define new target data profiles to be detected, modify existing target data profiles, etc.

Content-based classifier 906 can perform content-based classification using target data entity comparison component 934 by comparing the data items to predefined target data profiles. Classifier training component 908 is configured to training the content-based classifier by using the training data 940. The content-based classifier can be any of a wide variety of classifiers including, but not limited to, a rules-based classifier, a machine learned classifier (e.g., a deep learning system), a heuristics-based classifier, or other type of classifier or classification model.

An example classifier includes a classification engine that evaluates extracted content, extracted from the schema objects, and content metadata based on a content rule or model, trained with the training data. For example, a portion of content can be matched to a content rule if a characteristic of the content satisfies a condition of the content rule. For instance, a classifier can compare the extracted content to the target data profiles using one or more similarity measures. A similarity measure can be used by the classifier to determine whether a data item extracted from a content object is determined to match a given target data profile. Examples of similarity measures include, but are not limited to, k-gram overlap, edit distance, Cosine similarity, Manhatten distance, Euclidean distance, Levenshtein distance, to name a few.

Figure 19:
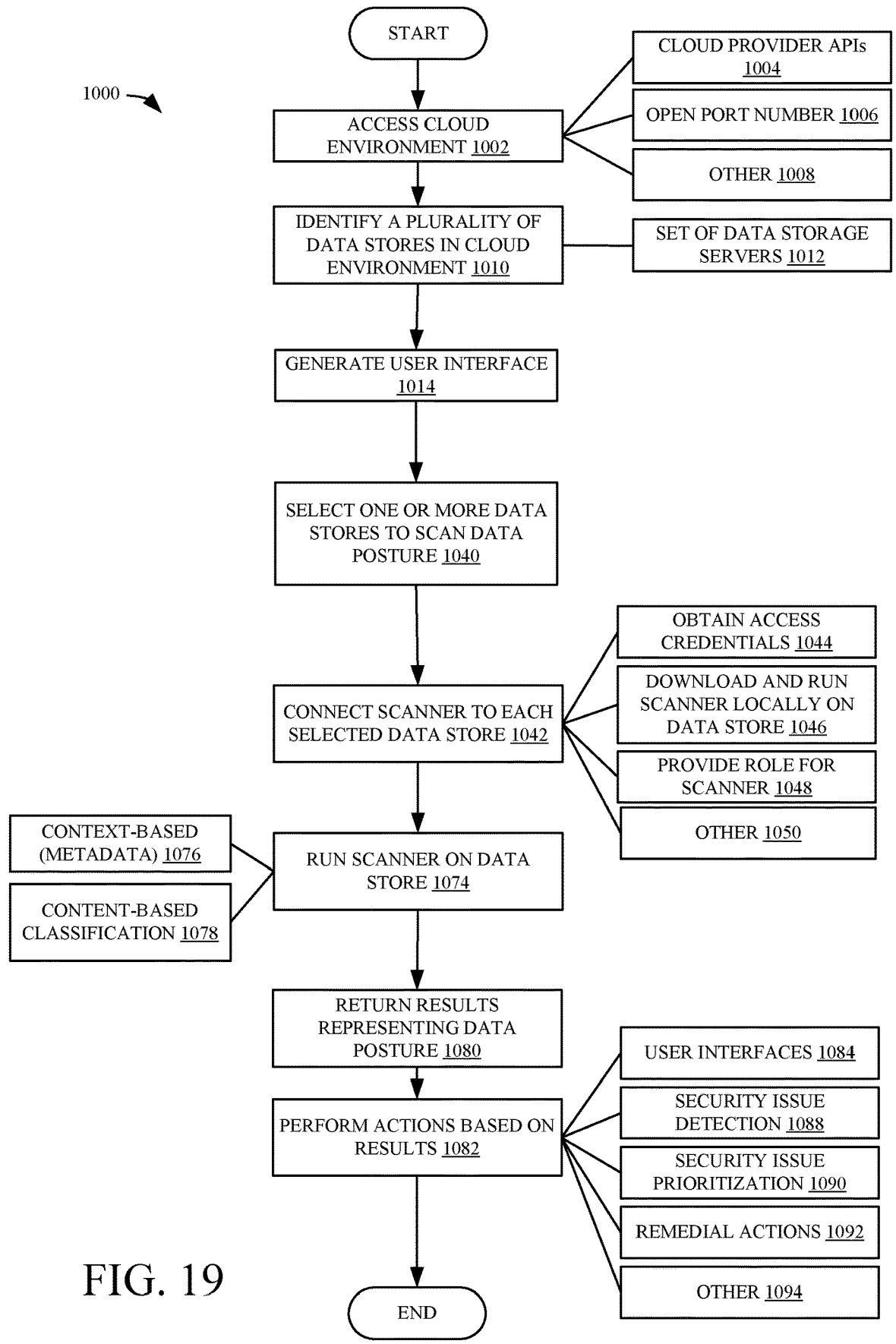
FIG. 19 is a flow diagram illustrating one example of scanning data stores in a cloud environment.

FIG. 19 is a flow diagram 1000 illustrating one example of scanning data stores in a cloud environment. For sake of illustration, but not by limitation, FIG. 19 will be discussed in the context of cloud security posture analysis system 122.

At block 1002, system 122 accesses a cloud account in a cloud environment onboarded by cloud account onboarding component 202. Onboarding can be done in any of a number of ways. For example, the cloud environment can be accessed through a cloud provider application programming interface (API) at block 1004. The cloud environment can also be accessed using open port numbers at block 1006. Of course, the cloud environment can be accessed in other ways as well, as represented at block 1008.

At block 1010, a plurality of data stores is identified in the cloud environment. In one example, the plurality of data stores includes a set of data storage servers. Thus, each data store can include a server having one or more databases logically defined thereon, as represented at block 1012.

At block 1014, a user interface display is generated that displays the identified data stores. One example of a user interface display 1016 is illustrated in FIG. 20. As shown in FIG. 20, user interface display 1016 includes a display pane 1018 that displays the plurality of identified data stores in a tabular format. Each of a plurality of entries is a row in pane 1018 and represents one of the data stores. A plurality of columns in pane 1018 identify a name (column 1020) of the data store, a type (column 1022) of the data store, a volume (column 1024) of the data store, and a storage engine (column 1026) used by the data store. Each entry can also include a likelihood metric (column 1028) and an impact metric (column 1030), that indicate breach likelihood and breach impact, respectively, for that data store. Examples of determining breach likelihood and impact are discussed above.

Each entry can also identify detected entities (e.g., detected instances of target data profiles 940) in the data store. In the illustrated example, column 1032 includes one or more display elements 1033, where each display element 1033 represents a particular target data profile along with a numeric representation of how many instances of the target data profile have been detected in the particular data store. For instance, in FIG. 20, nine instances of the "domain-_name" profile have been detected in the data store ABC. The display elements can be actuatable to navigate the user to the corresponding instances in the data store.

Each entry can also identify detected composite profiles identified in the data store. In the illustrated example, column 1034 includes one or more display elements 1035, wherein each display element 1035 represents a particular composite profile along with a numeric representation of how many instances of the target data profile have been detected in the particular data store. A composite profile includes combinations of target data profiles (e.g., profiles 940). Examples are discussed below. Briefly, a composite profile can include two or more different data entities within a threshold proximity (e.g., a same row in a table, a threshold number of words, etc.). For instance, in FIG. 20, twenty-three instances of the "person" profile have been detected within a threshold proximity of the "email" profile in the data store ABC.

A user can navigate to display pane 1018 to visualize the structured databases through actuation of a structured database control 1036. The user can also navigate between the data stores, databases, tables, and columns within the data store, through a set of controls 1038.

Referring again to FIG. 19, at block 1040, one or more data stores are selected to scan. At block 1042, one or more scanners are connected to each selected data store. Connecting a data store can be performed in any of a number of ways. At block 1044, access credentials can be obtained for each selected data store. For example, the user can enter a username and password for a data store, which is stored by the scanner to obtain access to the data for subsequent scanning.

In another example, at block 1046, the scanner can be downloaded and run locally on the data store. At block 1048, a role can be provided to the scanner, which allows the scanner to access data stores in the cloud environment through the role (such as a cloud provider role, etc.). Of course, a scanner can be connected to the data stores in other ways as well, as represented at block 1050.

Figure 21:
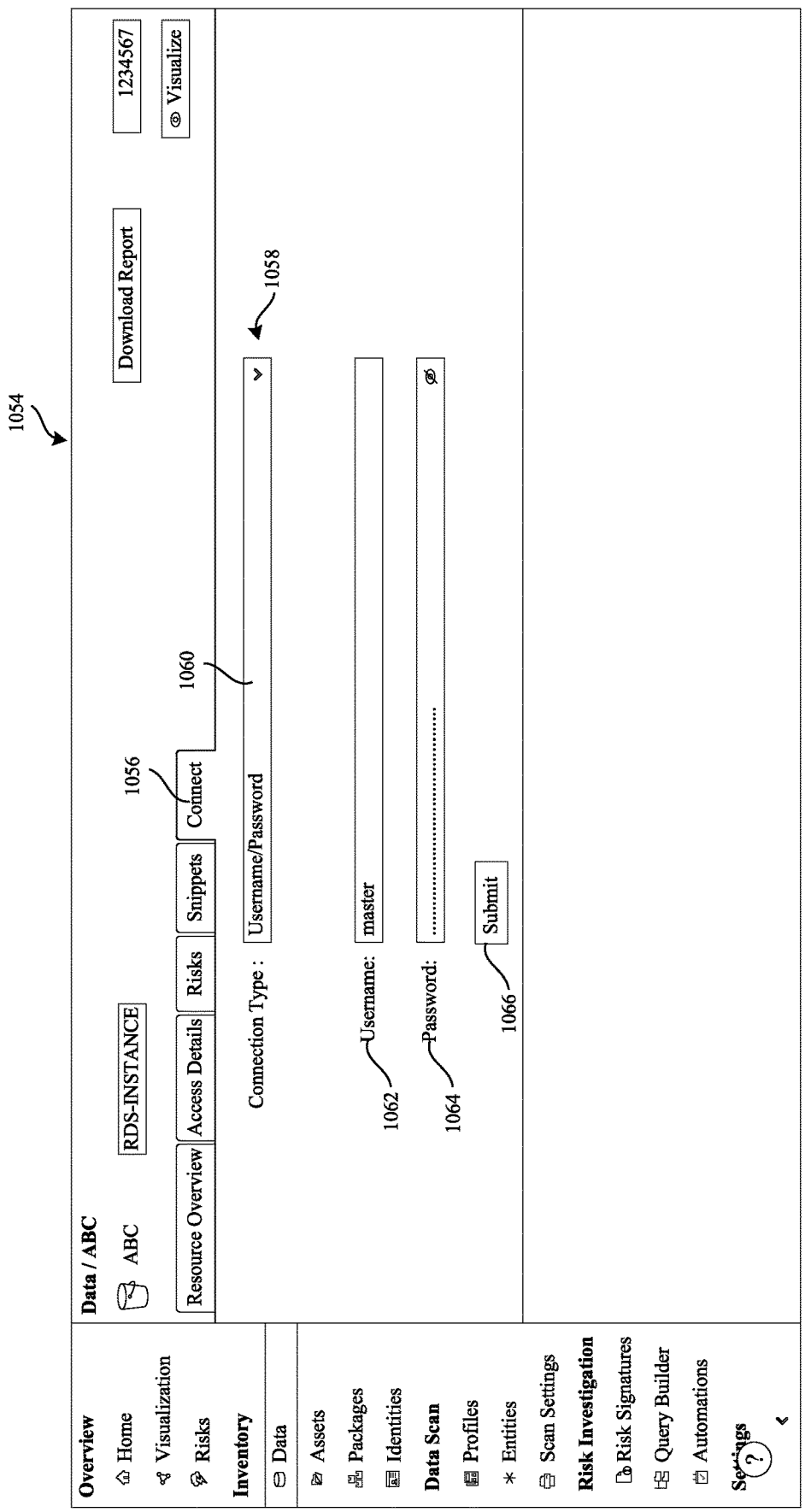
FIG. 21 illustrates an example user interface display for connecting a data store.

In FIG. 20, one example of selecting a data store includes user actuation of a database selection control 1052. In response to actuation of control 1052, a user interface is displayed for connecting the data store corresponding to the selected control 1052 (data store "ABC" in the present example). FIG. 21 illustrates one example of a user interface display 1054 for connecting the data store.

Figure 22:
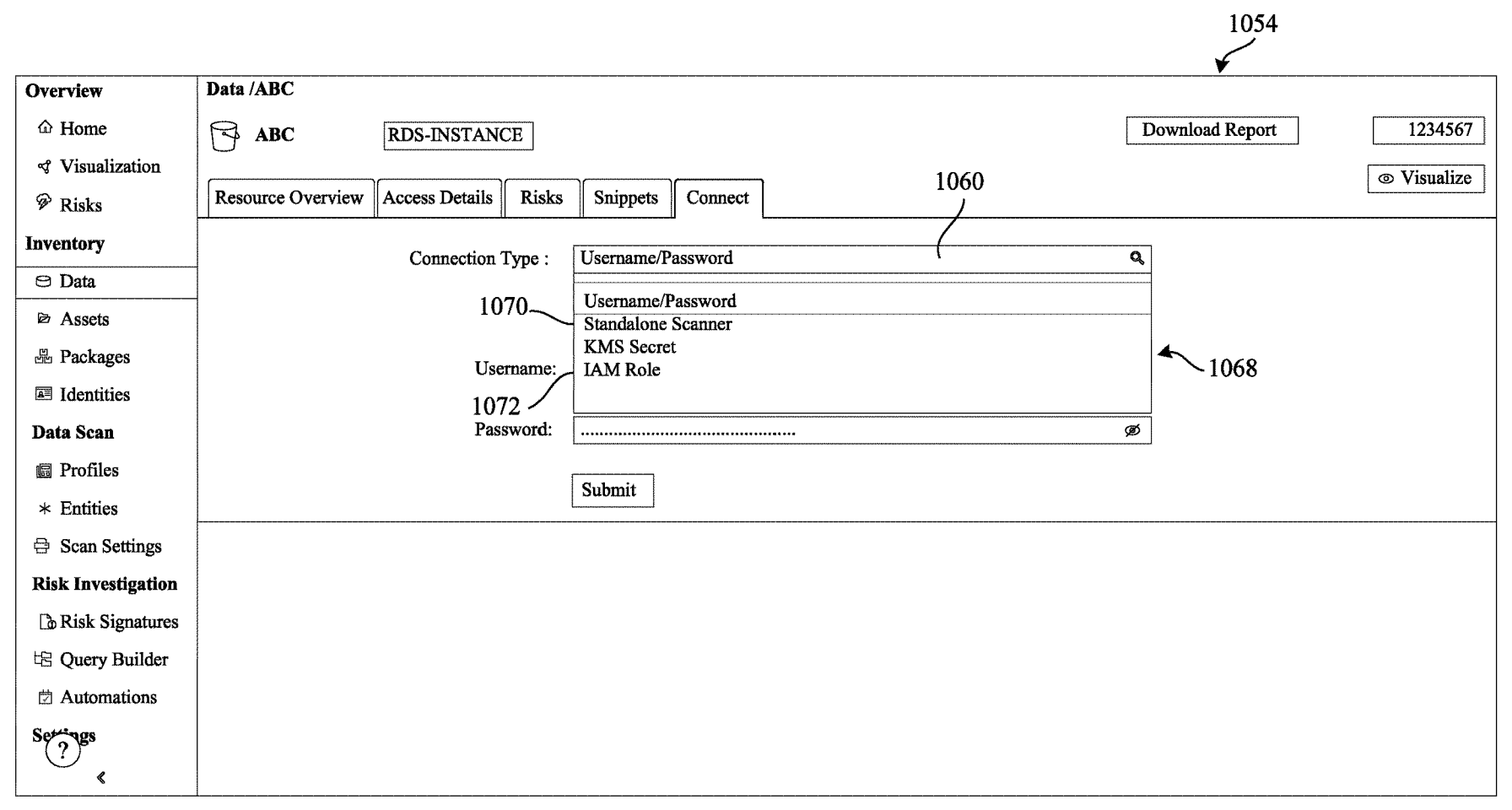

As shown in FIG. 21, user interface display 1054 includes a data store connection display tab 1056 actuatable to provide user input mechanisms 1058 for entering access credentials for the data store. User input mechanisms 1058 include a connection type input mechanism 1060 actuatable to select the connection type, for example from a drop-down menu. In the example of FIG. 21, a "username/password" connection type is selected, and a username input mechanism 1062 and a password input mechanism 1064 are rendered for receiving a username and password, respectively, for the data store "ABC". The user enters the username and password and submits the access credentials by actuating control 1066. FIG. 22 illustrates user interface display 1054 where a user has actuated mechanism 1060 and is provided with a set of selectable connection type options 1068. Here, a drop-down menu includes, in addition to the username/password connection type, a standalone scanner connection type 1070 actuatable to download and run the scanner locally on the data store. Another connection type control 1072 is selectable to provide a cloud provider role to the scanner for accessing the data store.

Referring again to FIG. 19, at block 1074 the scanner is run on the data store to perform context-based classification at block 1076 and content-based classification at block 1078.

At block 1080, results are returned representing the data posture and one or more actions are performed based on the results at block 1082. For example, one or more user interfaces can be generated at block 1084 providing the results of the scan, as well as providing user input mechanisms for a user to interact with the results, for example to drill up or drill down in the results, perform remedial actions, etc. At block 1088, security issue detection can be performed to detect security issues based on the scan results. In one example, security issue prioritization is performed at block 1090. Examples of security issue detection and prioritization are discussed above. Remedial actions are illustrated at block 1092. Of course, other actions can be performed at block 1094.

Figures 1, 23:
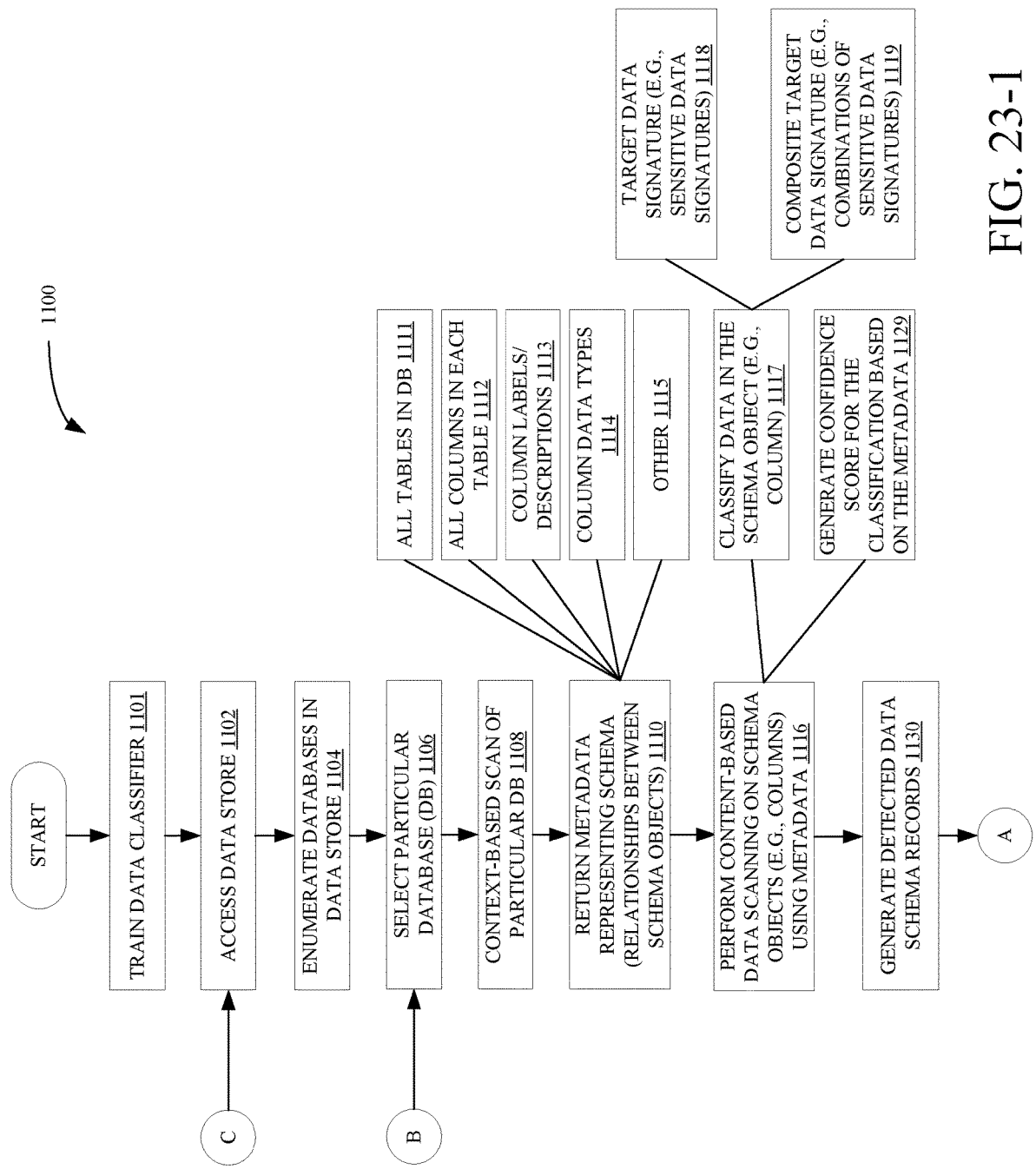
Figures 2, 23:
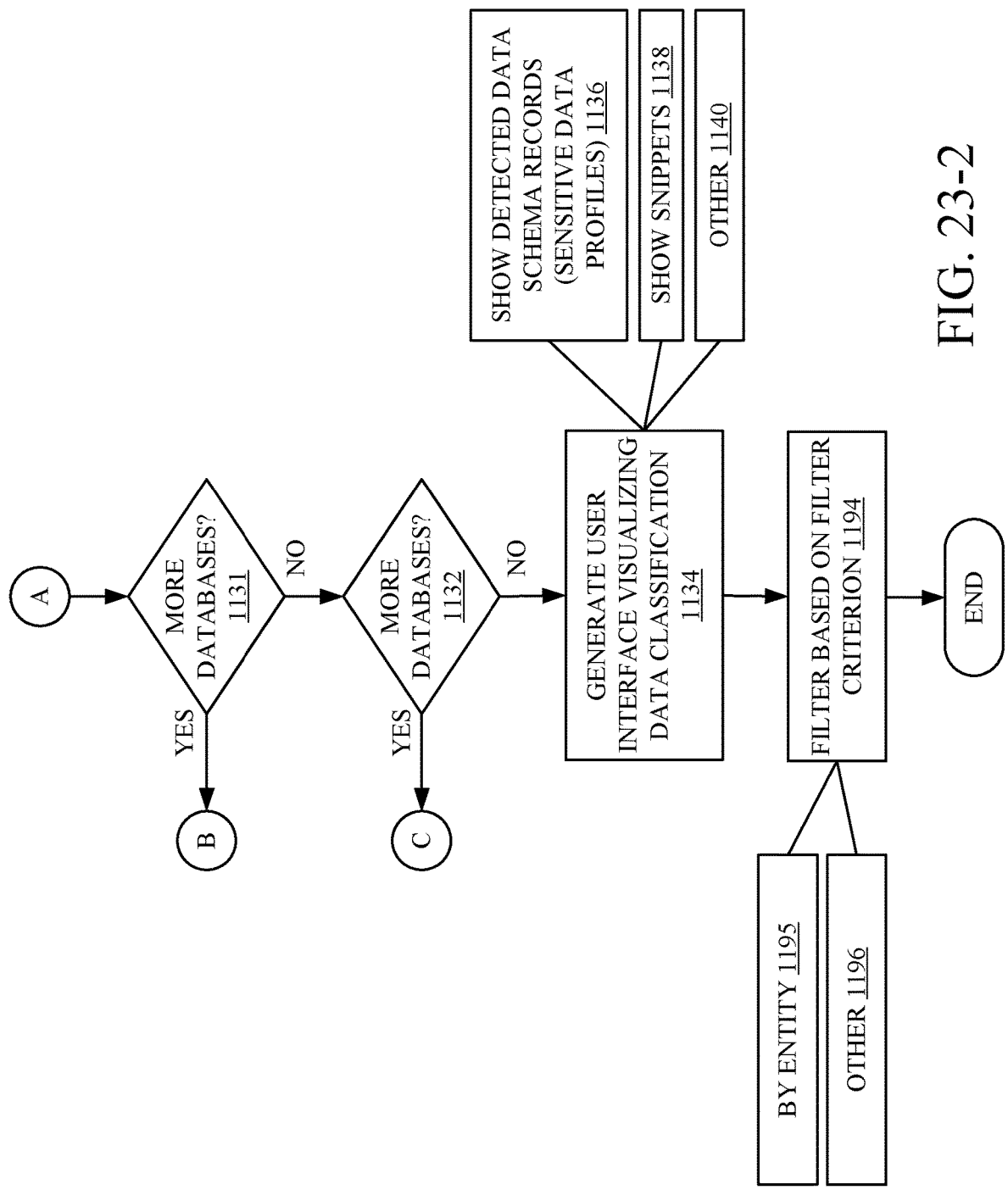

FIGS. 23-1 and 23-2 (collectively referred to as FIG. 23) provide a flow diagram 1100 illustrating one example of performing content-based classification of data items. For sake of illustration, but not by limitation, FIG. 23 will be discussed in the context of cloud security posture analysis system 122.

At block 1101, content-based classifier 906 is trained based on training data 940. At block 1102, a data store is accessed using, for example, the access credentials obtained at block 1044 and/or the role provided at block 1048. At block 1104, databases in the data store are enumerated, for example based on metadata 930 obtained from data store 912. For instance, the metadata 930 can identify a location of and/or include a link to each database.

A first database is selected from the enumerated databases at block 1106 and the database is scanned at block 1108. At block 1110, metadata is returned representing the data schema. For instance, relationship data representing a relationship between a set of schema objects in the database is returned. The metadata can identify all the tables in the database at block 1111, and all columns in each table at block 1112. Also, the metadata can identify column labels and/or a column description at block 1113, and the metadata can identify column data types at block 1114. Of course, other metadata can be retuned as well, as represented at block 1115.

At block 1116, content-based data scanning is performed on the schema objects using the metadata return at block 1110. For example, based on the metadata, all schema objects (e.g., all tables and columns) are enumerated and accessed to classify data items in the schema object at block 1117. In one example, at block 1118, the data is classified based on one or more target data entities, such as one or more of sensitive data profiles 254. Thus, block 1118 identifies instances of data profiles 254 in a schema object. At block 1119, instances of composite data signatures or profiles can be detected. For example, a composite data profile can include two or more detected entities within a threshold proximity (e.g., a same row in a table, a threshold number of words, etc.). Thus, block 1119 obtains the threshold proximity and scans the schema object for occurrences of two or more data profiles within the threshold proximity. For instance, for a "person_n_email" composite data profile, block 1119 scans a table for occurrences of the "person" profile and the "email" profile within a same row of the table. In some instances, an occurrence of a single data profile can indicate a low or moderate data security risk. However, an occurrence of the same data profile in combination with another data profile can indicate of high data security risk. To illustrate, a name or address alone may not be considered personal identifiable information (PII), but a name and address together in a row may be considered PII.

Accordingly, usage of composite data profiles can increase the fidelity of the sensitivity of data that is detected and classified.

In one example of block 1118, metadata 930 is obtained from data store 912 and used to identify a structure of schema objects in the first database. For instance, the metadata 930 can identify a number of tables and respective columns in the first database. Using this metadata, classifier 960 iteratively selects each column and determines whether any data items in the selected column matches one of the target data profiles to within a similarity measure.

Figures 1, 24:
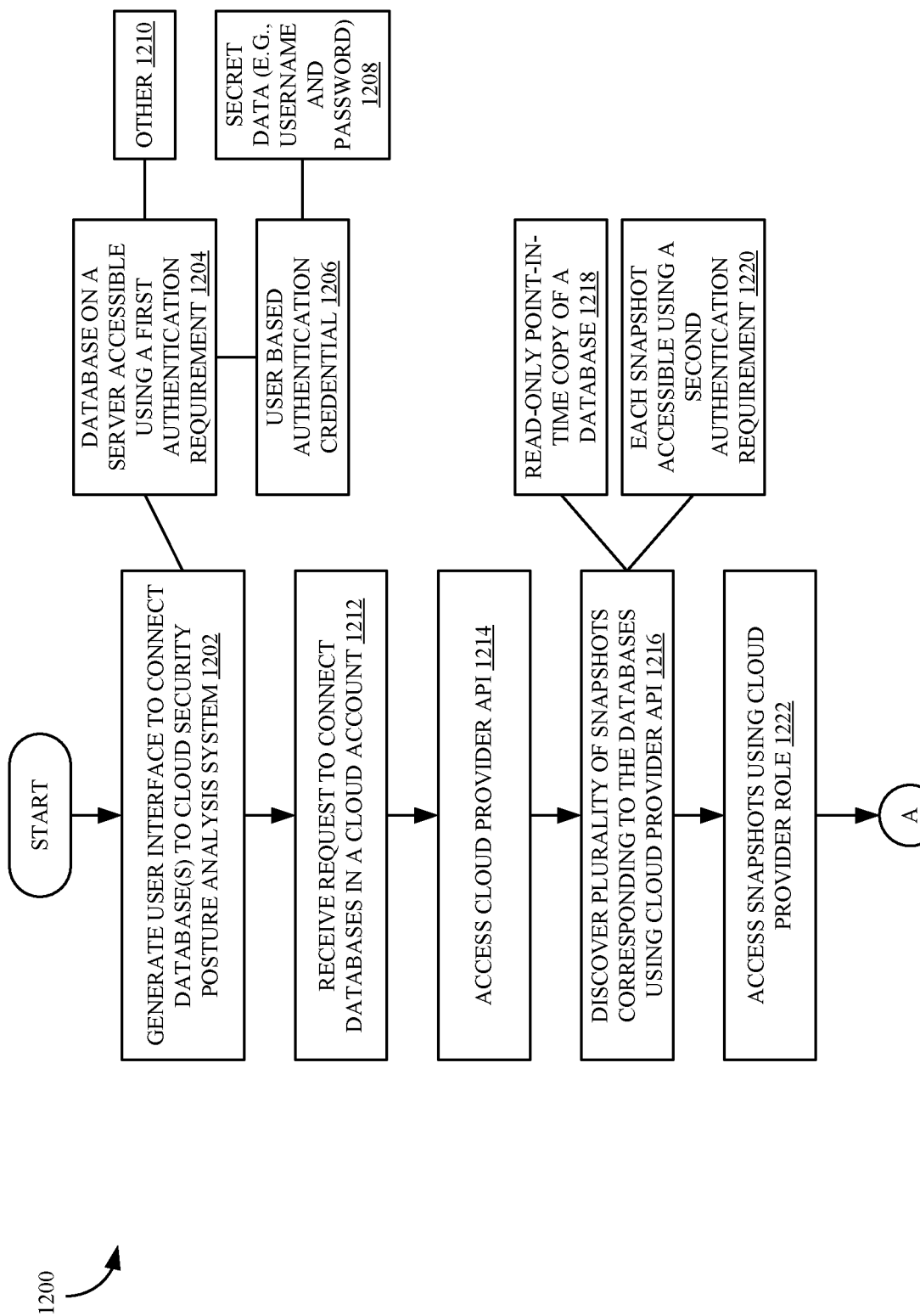
Figures 2, 24:
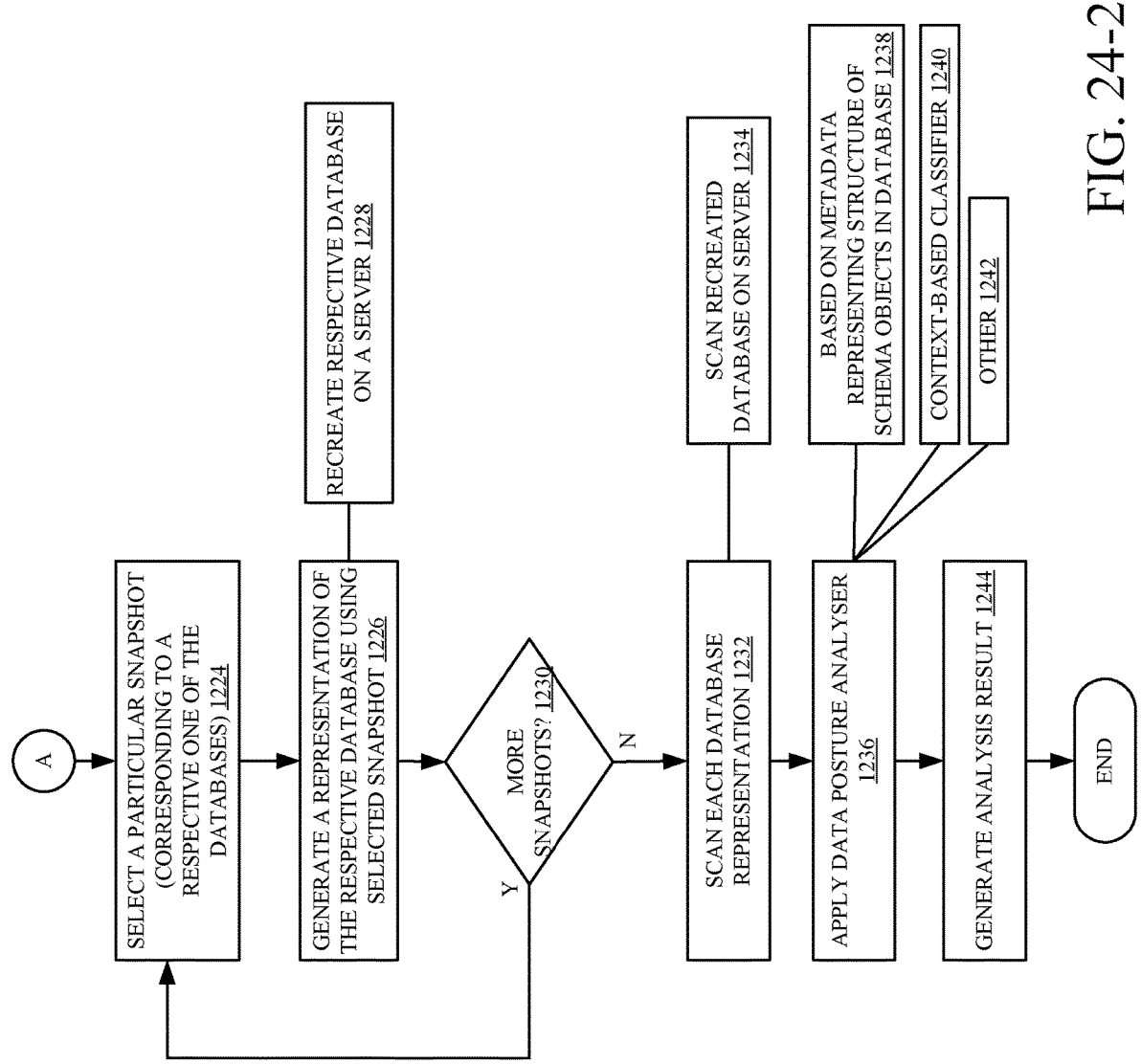

FIGS. 24-1 and 24-2 (collectively referred to as FIG. 24) provide a flow diagram 1200 of an example operation of a cloud data schema detection system that performs data posture analytics using snapshotting. For sake of illustration, but not by limitation, FIG. 24 will be discussed in the context of cloud security posture analysis system 122.

At block 1202, a user interface is generated to connect one or more databases to cloud security posture analysis system 122. Examples of user interface displays for selecting databases to connect to the cloud security posture analysis system are discussed above with respect to FIGS. 20-22.

As noted above, an example database on a server in cloud environment 102 is accessible using a first authentication requirement. Accessing a server using a first authentication requirement is represented at block 1204. The authentication requirement can include a user-based authentication credential at block 1206. For instance, the authentication credential can include secret data, such as a username and password at block 1208. Of course, other authentication credentials can be utilized to access a database in a cloud environment, as represented at block 1210.

Figure 25:
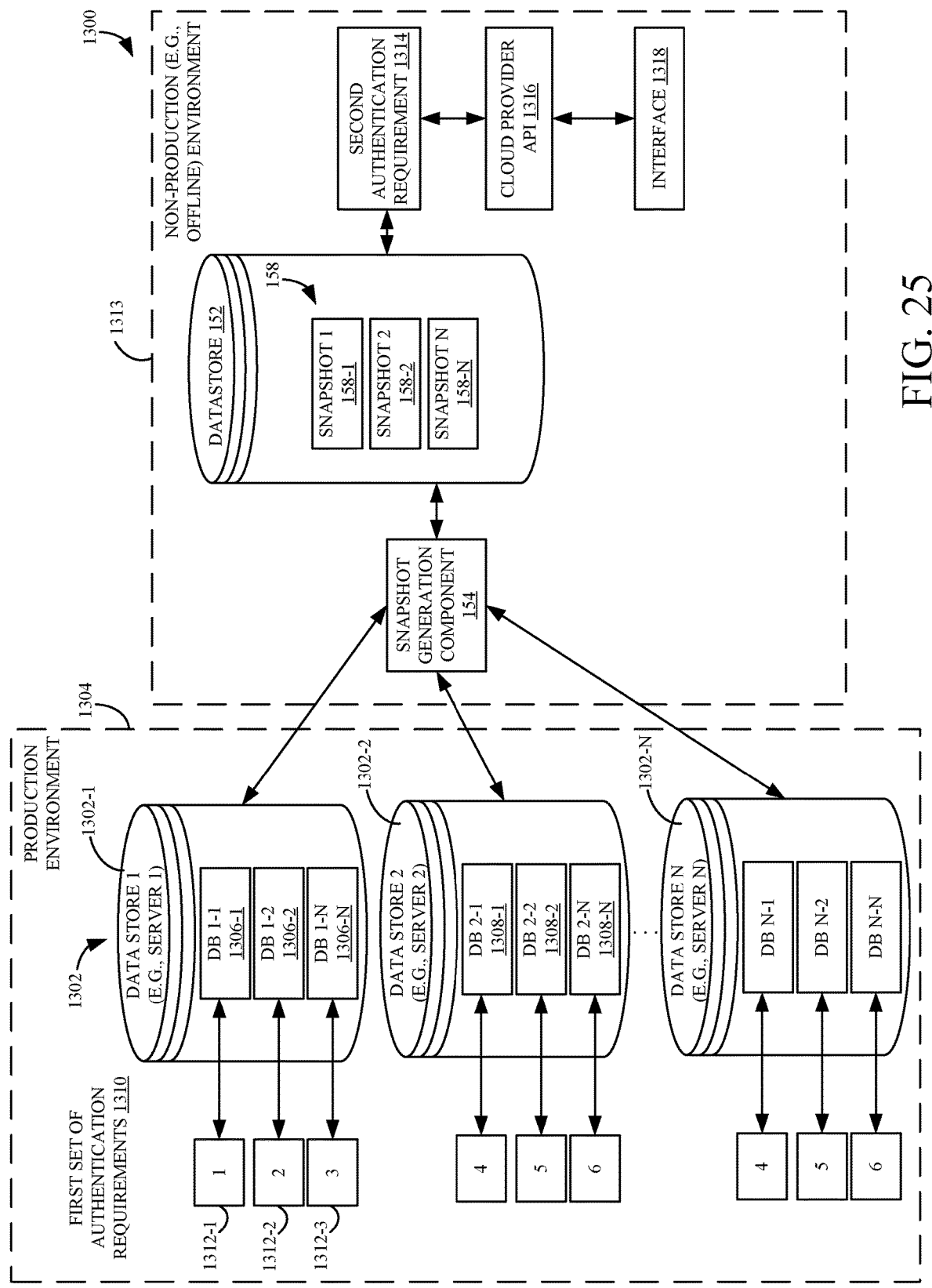
FIG. 25 illustrates one example of a cloud environment having a plurality of data stores in a production environment.

FIG. 25 illustrates one example of a cloud environment 1300 having a plurality of data stores 1302 in a production environment 1304. Data stores 1302 include a first data store 1302-1, a second data store 1302-2, and can include any of a number of additional data stores 1302-N. Each data store of the plurality of data stores 1302 can include a data storage server having a plurality of databases logically defined thereon. For example, data store 1302-1 includes a first database 1306-1, and second database 1306-2, and any of a number of additional databases 1306-N (collectively referred to as databases 1306 on data store 1302-1). Similarly, data store 1302-2 can include a plurality of databases 1308-1, 1308-2, and 1308-N.

The databases in production environment 1304 are accessible by any of a number of actors, such as actors 104 shown in FIG. 1. The databases are accessible to, for example, read data, write data, modify data, etc. The databases are accessible using authentication requirements in a first set of authentication requirements 1310. Authentication requirements 1310 illustratively include a plurality of individual authentication requirements, each authentication requirement pertaining to a different one (or more) of the databases. For sake of illustration, but not by limitation, the authentication requirements will be discussed in the context of a user-based authentication credential, such as a username and password. Of course, other types of authentication credentials can be utilized as well.

As illustrated, a first authentication credential 1312-1 is required to access database 1306-1, a second authentication credential 1312-2 is required to access database 1306-2, a third authentication credential 1312-3 is required to access database 1306-N, etc. According, as can be seen in FIG. 25, for a production environment having a large number of databases, a large number of authentication requirements are required to access the data on those databases.

Snapshot generation component 154 is configured to access the databases in data stores 1302 to generate snapshots 158 in a non-production environment 1313, that are stored in data store 152. For example, snapshot generation component 154 can be configured to generate snapshot 158-1 representing database 1306-1 periodically, such as every hour, day, week, etc.

The non-production environment 1313 is illustratively a separate environment from production environment 1304. In some instances, environment 1313 can be considered an offline environment relative to the production environment 1304, in that the snapshots 158 are generally not accessed in real-time by end users who access data stores 1302.

Snapshots 158 are accessible using a second authentication requirement 1314, that is different than the authentication requirements in the first set of authentication requirements 1310. In the present example, snapshots 158 are accessible using an authentication requirement other than a user-based authentication credential.

In the example of FIG. 25, the second authentication requirement 1314 includes a cloud provider role through a cloud provider API 1316. Thus, an interface 1318 in the cloud environment can access, analyze, and display the snapshots 158 in data store 152. For example, a particular snapshot 158-1 can be retrieved from data store 152 and utilized to recreate database 1306-1 on a server, separate from the data store server that includes data store 1302-1.

Referring again to FIG. 24, at block 1212, a request to connect a plurality of databases (e.g., databases 1306, 1308) in a cloud account is received. Cloud provider API 1316 is accessed at block 1214 to discover, at block 1216, a plurality of snapshots 158 corresponding to the databases in data stores 1302. As noted above, a snapshot can include a read-only point-in-time copy of a database, as represented at block 1218. Further, each snapshot is accessible using the second authentication requirement 1314, as represented at block 1220.

At block 1222, the snapshots are accessed using the cloud provider role through the cloud provider interface. Accordingly, a same authentication requirement can be utilized to access numerous snapshots (for some or all) of the databases to be analyzed. This removes any requirement to obtain access credentials for each database individually, which reduces the need of a user experience to receive, store, and transmit all of the access credentials for the databases, and can also improve data security as it does not require the user to provide all of the access credentials to the servers in the production environment.

At block 1224, a particular snapshot (corresponding to a respective one of the databases) is selected and used to generate, at block 1226, a representation of the respective database. For example, the respective database is recreated on a second server, separate from the server having the datastore on which the database is stored. This is represented at block 1228.

At block 1230, it is determined whether there are any additional snapshots. If so, operation returns to block 1224. At block 1232, each database representation, generated from the snapshots, is scanned. In the illustrated example, scanning the database includes scanning the recreated database on the server.

At block 1236, a data posture analyzer is applied. Examples are discussed above. For sake of illustration, in one example, the analyzer analyzes the data based on metadata representing a structure of schema objects in the database, as represented at block 1238. Alternatively, or in addition, a content-based classifier can be applied to the data. Of course, the data can be analyzed in other ways as well, as represented at block 1242.

At block 1244, an analysis result is generated, which can include storing the data posture analysis, generating a user interface that renders the analysis result, or any other output or actions relative to the data posture analysis result.

It can thus be seen that the present disclosure describes technology for security posture analysis of a cloud account. In some described examples, the technology can discover sensitive data among the cloud storage resources and as well as access patterns to the sensitive data, using local scanners that reduce or eliminate need to send the cloud data outside the cloud environment. This improves data security. Further, the technology facilitates the discover of security vulnerabilities to understand the data security posture, detect, and remediate the security vulnerabilities, and to prevent future breaches to sensitive data. The system provides real-time visibility and control on the control data infrastructure by discovering resources, sensitive data, and access paths, and tracking resource configuration, deep context, and trust relationships in real-time as a graph or other visualization.

One or more implementations of the technology disclosed or elements thereof can be implemented in the form of a computer product, including a non-transitory computer readable storage medium with computer usable program code for performing the method steps indicated. Furthermore, one or more implementations and clauses of the technology disclosed or elements thereof can be implemented in the form of an apparatus including a memory and at least one processor that is coupled to the memory and operative to perform exemplary method steps. Yet further, in another aspect, one or more implementations and clauses of the technology disclosed or elements thereof can be implemented in the form of means for carrying out one or more of the method steps described herein; the means can include (i) hardware module(s), (ii) software module(s) executing on one or more hardware processors, or (iii) a combination of hardware and software modules; any of (i)-(iii) implement the specific techniques set forth herein, and the software modules are stored in a computer readable storage medium (or multiple such media).

Examples discussed herein include processor(s) and/or server(s). For sake of illustration, but not by limitation, the processors and/or servers include computer processors with associated memory and timing circuitry, and are functional parts of the corresponding systems or devices, and facilitate the functionality of the other components or items in those systems.

Also, user interface displays have been discussed. Examples of user interface displays can take a wide variety of forms with different user actuatable input mechanisms. For instance, a user input mechanism can include icons, links, menus, text boxes, check boxes, etc., and can be actuated in a wide variety of different ways. Examples of input devices for actuating the input mechanisms include, but are not limited to, hardware devices (e.g., point and click devices, hardware buttons, switches, a joystick or keyboard, thumb switches or thumb pads, etc.) and virtual devices (e.g., virtual keyboards or other virtual actuators). For instance, a user actuatable input mechanism can be actuated using a touch gesture on a touch sensitive screen. In another example, a user actuatable input mechanism can be actuated using a speech command.

The present figures show a number of blocks with corresponding functionality described herein. It is noted that fewer blocks can be used, such that functionality is performed by fewer components. Also, more blocks can be used with the functionality distributed among more components. Further, the data stores discussed herein can be broken into multiple data stores. All of the data stores can be local to the systems accessing the data stores, all of the data stores can be remote, or some data stores can be local while others can be remote.

The above discussion has described a variety of different systems, components, logic, and interactions. One or more of these systems, components, logic and/or interactions can be implemented by hardware, such as processors, memory, or other processing components. Some particular examples include, but are not limited to, artificial intelligence components, such as neural networks, that perform the functions associated with those systems, components, logic, and/or interactions. In addition, the systems, components, logic and/or interactions can be implemented by software that is loaded into a memory and is executed by a processor, server, or other computing component, as described below. The systems, components, logic and/or interactions can also be implemented by different combinations of hardware, software, firmware, etc., some examples of which are described below. These are some examples of different structures that can be used to implement any or all of the systems, components, logic, and/or interactions described above.

The elements of the described figures, or portions of the elements, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 26:
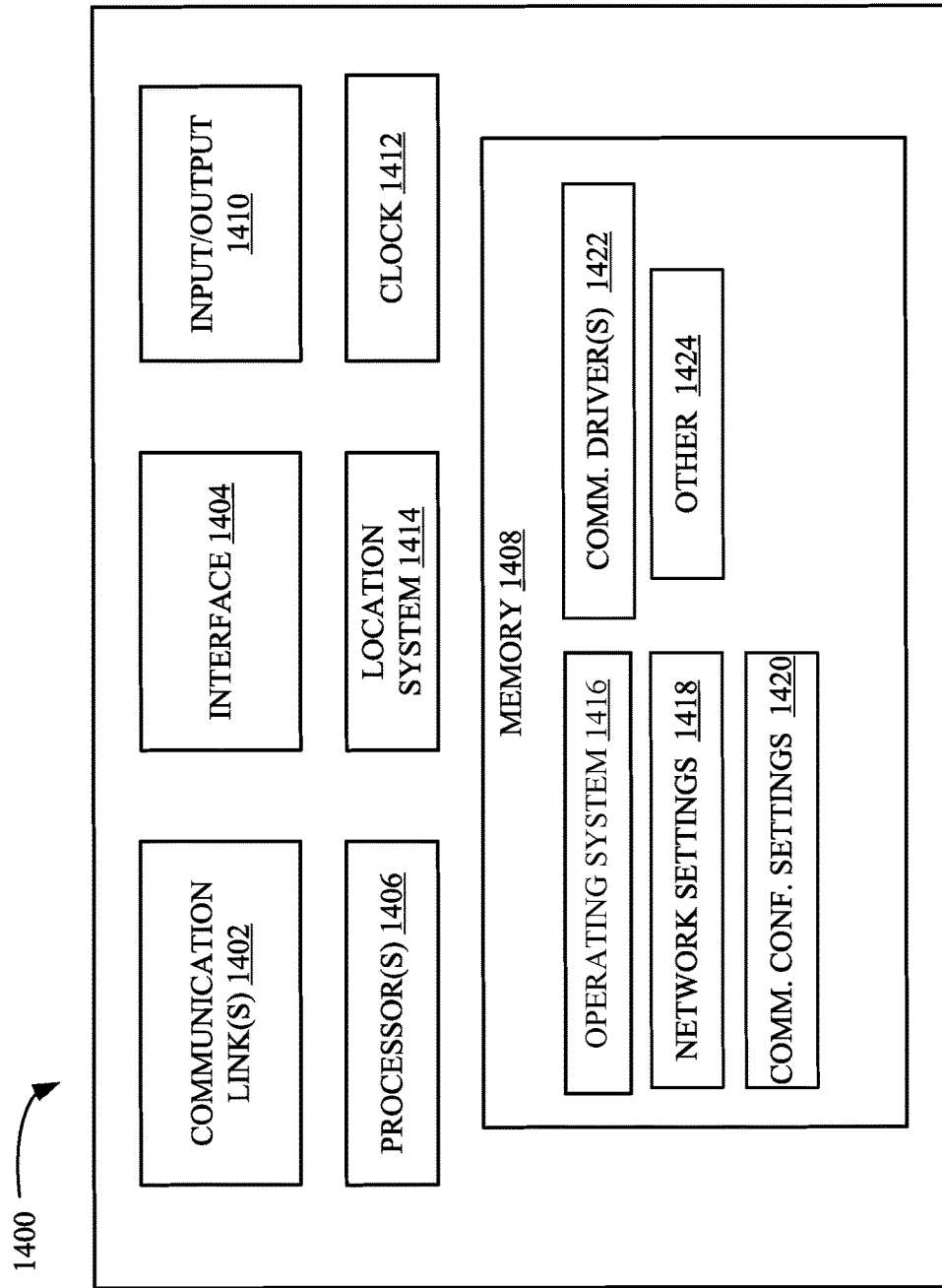
FIG. 26 is a simplified block diagram of one example of a client device.
Figure 27:
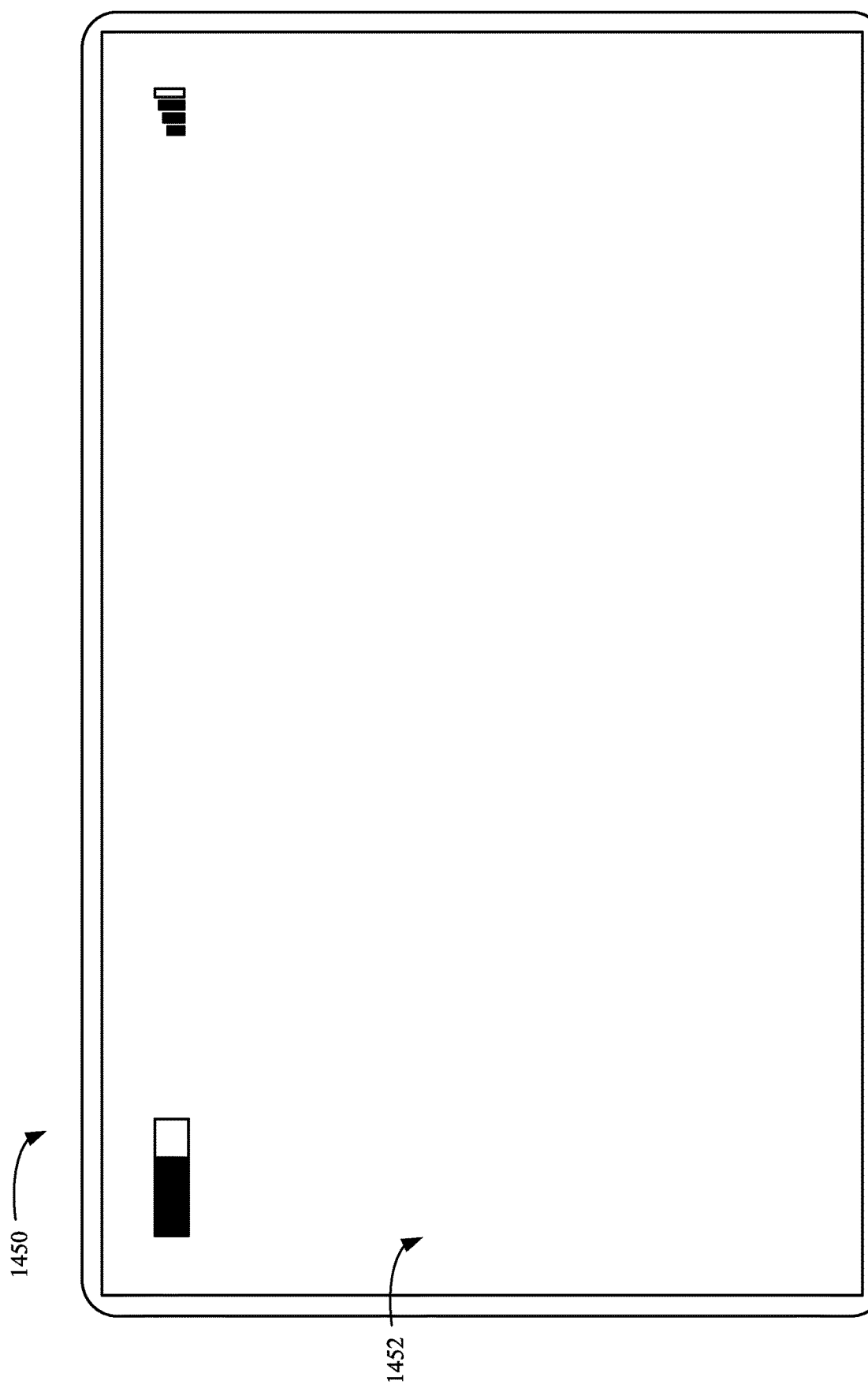
FIG. 27 illustrates an example of a handheld or mobile device.

FIG. 26 is a simplified block diagram of one example of a client device 1400, such as a handheld or mobile device, in which the present system (or parts of the present system) can be deployed. FIG. 27 illustrates an example of a handheld or mobile device.

One or more communication links 1402 allows device 1400 to communicate with other computing devices, and can provide a channel for receiving information automatically, such as by scanning. An example includes communication protocols, such as wireless services used to provide cellular access to a network, as well as protocols that provide local wireless connections to networks.

Applications or other data can be received on an external (e.g., removable) storage device or memory that is connected to an interface 1404. Interface 1404 and communication links 1402 communicate with one or more processors 1406 (which can include processors or servers described with respect to the figures) along a communication bus (not shown in FIG. 26), that can also be connected to memory 1408 and input/output (I/O) components 1410, as well as clock 1412 and a location system 1414.

Components 1410 facilitate input and output operations for device 1400, and can include input components such as microphones, touch screens, buttons, touch sensors, optical sensors, proximity sensors, orientation sensors, accelerometers. Components 1410 can include output components such as a display device, a speaker, and or a printer port.

Clock 1412 includes, in one example, a real time clock component that outputs a time and date, and can provide timing functions for processor 1406. Location system 1414 outputs a current geographic location of device 1400 and can includes a global positioning system (GPS) receiver, a LORAN system, a dead reckoning system, a cellular triangulation system, or other positioning system. Memory 1408 stores an operating system 1416, network applications and corresponding configuration settings 1418, communication configuration settings 1420, communication drivers 1422, and can include other items 1424. Examples of memory 1408 include types of tangible volatile and non-volatile computer-readable memory devices. Memory 1408 can also include computer storage media that stores computer readable instructions that, when executed by processor 1406, cause the processor to perform computer-implemented steps or functions according to the instructions. Processor 1406 can be activated by other components to facilitate functionality of those components as well.

FIG. 27 illustrates one example of a tablet computer 1450 having a display screen 1452, such as a touch screen or a stylus or pen-enabled interface. Screen 1452 can also provide a virtual keyboard and/or can be attached to a keyboard or other user input device through a mechanism, such as a wired or wireless link. Alternatively, or in addition, computer 1450 can receive voice inputs.

Figure 28:
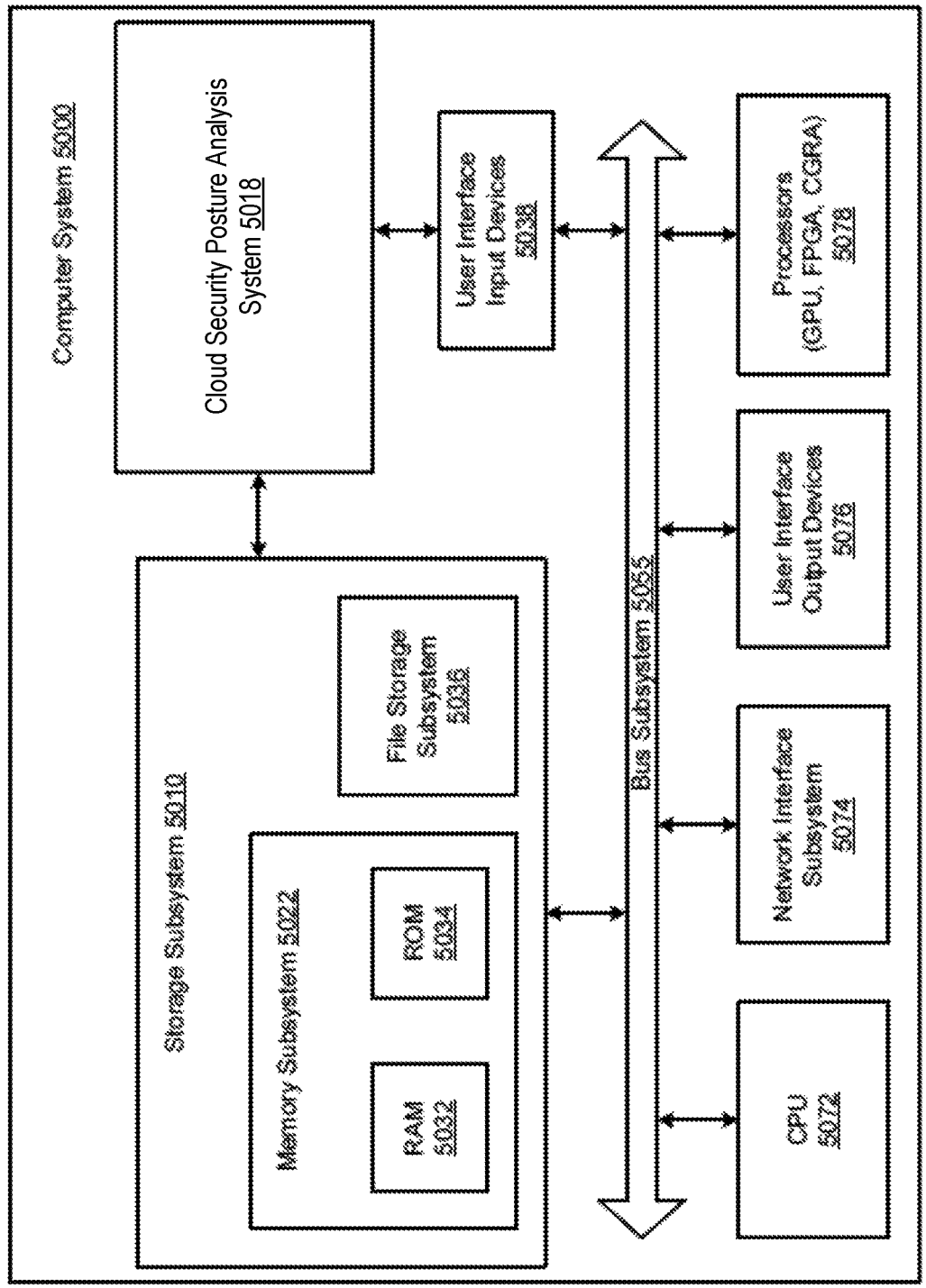
FIG. 28 shows an example computer system.

FIG. 28 shows an example computer system 5000 that can be used to implement the technology disclosed. Computer system 5000 includes at least one central processing unit (CPU) 5072 that communicates with a number of peripheral devices via bus subsystem 5055. These peripheral devices can include a storage subsystem 5010 including, for example, memory devices and a file storage subsystem 5036, user interface input devices 5038, user interface output devices 5076, and a network interface subsystem 5074. The input and output devices allow user interaction with computer system 5000. Network interface subsystem 5074 provides an interface to outside networks, including an interface to corresponding interface devices in other computer systems.

In one implementation, cloud security posture analysis system 5018 is communicably linked to the storage subsystem 5010 and the user interface input devices 5038.

User interface input devices 5038 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 5000.

User interface output devices 5076 can include a display subsystem, a printer, a fax machine, or non-visual displays such as audio output devices. The display subsystem can include an LED display, a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 5000 to the user or to another machine or computer system.

Storage subsystem 5010 stores programming and data constructs that provide the functionality of some or all of the modules and methods described herein. These software modules are generally executed by processors 5078.

Processors 5078 can be graphics processing units (GPUs), field-programmable gate arrays (FPGAs), application-specific integrated circuits (ASICs), and/or coarse-grained reconfigurable architectures (CGRAs). Processors 5078 can be hosted by a deep learning cloud platform such as Google Cloud Platform™, Xilinx™, and Cirrascale™. Examples of processors 5078 include Google's Tensor Processing Unit (TPU)™, rackmount solutions like GX4 Rackmount Series™, GX50 Rackmount Series™, NVIDIA DGX-1™, Microsoft' Stratix V FPGA™, Graphcore's Intelligent Processor Unit (IPU)™, Qualcomm's Zeroth Platform™ with Snapdragon Processors™, NVIDIA's Volta™, NVIDIA's DRIVE PX™, NVIDIA's JETSON TX1/TX2 MODULE™, Intel's Nirvana™, Movidius VPU™, Fujitsu DPI™, ARM's DynamicIQ™, IBM TrueNorth™, Lambda GPU Server with Testa V100s™, and others.

Memory subsystem 5022 used in the storage subsystem 5010 can include a number of memories including a main random access memory (RAM) 5032 for storage of instructions and data during program execution and a read only memory (ROM) 5034 in which fixed instructions are stored. A file storage subsystem 5036 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 5036 in the storage subsystem 5010, or in other machines accessible by the processor.

Bus subsystem 5055 provides a mechanism for letting the various components and subsystems of computer system 5000 communicate with each other as intended. Although bus subsystem 5055 is shown schematically as a single bus, alternative implementations of the bus subsystem can use multiple busses.

Computer system 5000 itself can be of varying types including a personal computer, a portable computer, a workstation, a computer terminal, a network computer, a television, a mainframe, a server farm, a widely-distributed set of loosely networked computers, or any other data processing system or user device. Due to the ever-changing nature of computers and networks, the description of computer system 5000 depicted in FIG. 28 is intended only as a specific example for purposes of illustrating the preferred implementations of the present invention. Many other configurations of computer system 5000 are possible having more or less components than the computer system depicted in FIG. 28.

It should also be noted that the different examples described herein can be combined in different ways. That is, parts of one or more examples can be combined with parts of one or more other examples. All of this is contemplated herein.

The technology disclosed can be practiced as a system, method, or article of manufacture. One or more features of an implementation can be combined with the base implementation. Implementations that are not mutually exclusive are taught to be combinable.

One or more features of an implementation can be combined with other implementations. This disclosure periodically reminds the user of these options. Omission from some implementations of recitations that repeat these options should not be taken as limiting the combinations taught in the preceding sections—these recitations are hereby incorporated forward by reference into each of the following implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method for analyzing data posture in a cloud environment, the method comprising:

receiving a request to access a database in the cloud environment, wherein the database includes a first authentication requirement;

identifying a snapshot of the database, wherein the snapshot includes a second authentication requirement that is different than the first authentication requirement;

accessing the snapshot using the second authentication requirement;

generating a representation of the database using the snapshot;

receiving a request to perform data posture analysis of the database;

scanning the representation of the database to obtain metadata representing a structure of schema objects in the database;

based on the metadata, executing a content-based data classifier that analyzes content of data items in the schema objects by comparing the data items to predefined target data profiles and generates a classifier result that classifies the data items based on the content; and generating a representation of a user interface display that represents the data posture analysis of the database and renders the classifier result.

2. The computer-implemented method of claim 1, wherein the first authentication requirement comprises a user access credential, and the second authentication requirement comprises a cloud environment role.

3. The computer-implemented method of claim 2, wherein the user access credential comprises secret data corresponding to a user associated with the database, and wherein the cloud environment role comprises a cloud provider role.

4. The computer-implemented method of claim 2, wherein the database comprises a first database having a first user access credential, and wherein the snapshot comprises a first snapshot, and further comprising:

receiving a request to access a second database in the cloud environment, wherein the second database includes a second user access credential that is different than the first user access credential; and identifying a second snapshot of the second database, wherein the second snapshot includes a same authentication requirement as the first snapshot.

5. The computer-implemented method of claim 4, and further comprising:

discovering the first and second snapshots using a cloud provider application programming interface (API); and accessing each of the first and second snapshots through the cloud provider API.

6. The computer-implemented method of claim 1, wherein scanning the representation of the database comprises:

tracing network communication paths between pairs of compute resources and storage resources;

qualifying a subset of the pairs of the compute resources and the storage resources as vulnerable to breach attack; and generating a representation of propagation of the breach attack along the network communication paths, the representation of propagation of the breach attack identifying relationships between the subset of the pairs of the compute resources and the storage resources.

7. The computer-implemented method of claim 1, wherein the database is stored on a first server in the cloud environment, generating the representation of the database comprises recreating the database on a second server using the snapshot, and scanning the representation of the database comprises scanning the recreated database on the second server.

8. The computer-implemented method of claim 1, wherein the snapshot comprises a read-only point-in-time copy of the database, and the database is deployed in a production environment and configured to receive a user request for a data manipulation operation on data stored in the database.

9. The computer-implemented method of claim 1, wherein the schema objects comprise a data column within a table, and the data items comprise a plurality of cells within the data column.

10. A computing system comprising:

at least one processor; and memory storing instructions executable by the at least one processor, wherein the instructions, when executed, cause the computing system to:

receive a request to access a database in a cloud environment, wherein the database includes a user-based authentication credential;

identify a point-in-time copy of the database that includes a role-based authentication credential;

access the point-in-time copy using the role-based authentication credential;

generate a representation of the database using the point-in-time copy;

receive a request to perform data posture analysis of the database;

scan the representation of the database to obtain metadata representing a structure of schema objects in the database;

based on the metadata, execute a content-based data classifier that analyzes content of data items in the schema objects by comparing the data items to predefined target data profiles and generates a classifier result that classifies the data items based on the content; and generate a representation of a user interface display that represents the data posture analysis and renders the classifier result.

11. The computing system of claim 10, wherein the user-based authentication credential comprises a user access credential, and the role-based authentication credential comprises a cloud provider role.

12. The computing system of claim 11, wherein the user access credential comprises secret data corresponding to a user associated with the database.

13. The computing system of claim 11, wherein the database comprises a first database having a first user access credential, and wherein the point-in-time copy comprises a first point-in-time copy, and wherein the instructions, when executed, cause the computing system to:

receive a request to access a second database in the cloud environment, wherein the second database includes a second user access credential that is different than the first user access credential; and identify a second point-in-time copy of the second database, wherein the second point-in-time copy includes a same authentication requirement as the first point-in-time copy.

14. The computing system of claim 13, wherein the instructions, when executed, cause the computing system to:

discover the first and second point-in-time copies using a cloud provider application programing interface (API); and access each of the first and second point-in-time copies through the cloud provider API using the same authentication requirement.

15. The computing system of claim 10, wherein the database is deployed in a production environment and configured to receive a user request for a data manipulation operation on data stored in the database.

16. A computing system comprising:
at least one processor; and
memory storing instructions executable by the at least one processor, wherein the instructions, when executed, cause the computing system to:
receive one or more requests to access a plurality of databases in the cloud environment, wherein the plurality of databases includes different sets of authentication requirements;
identify a plurality of snapshots that correspond to the plurality of databases, wherein each snapshot, of the plurality of snapshots, includes an authentication requirement that is different than an authentication requirement of the database that corresponds to the snapshot;
access each snapshot of the plurality of snapshots using a cloud provider role defined in the cloud environment;
generate a set of representations of the plurality of databases using the plurality of snapshots;
receive a request to perform data posture analysis of the plurality of databases;
scan the set of representations of the plurality of databases to obtain metadata representing a structure of schema objects in the plurality of databases;
based on the metadata, execute a content-based data classifier that analyzes content of data items in the schema objects by comparing the data items to predefined target data profiles and generates a classifier result that classifies the data items based on the content; and
generate a representation of a user interface display that represents the data posture analysis sand renders the classifier result.

17. The computing system of claim 16, wherein
a first database of the plurality of databases has a first user access credential, and
a second database of the plurality of databases has a second user access credential.

18. The computing system of claim 16, wherein each particular snapshot of the plurality of snapshots comprises a read-only point-in-time copy of a respective database corresponding to the particular snapshot.

19. The computing system of claim 18, wherein
the instructions, when executed, cause the computing system to:
recreate each respective database, of the plurality of databases, in a cloud environment server using the snapshot corresponding to the respective database, and
scan the recreated databases to identify the data posture.

20. The computing system of claim 16, wherein the instructions, when executed, cause the computing system to:
trace network communication paths between pairs of compute resources and storage resources;
qualify a subset of the pairs of the compute resources and the storage resources as vulnerable to breach attack; and
generate a representation of propagation of the breach attack along the network communication paths, the representation of propagation of the breach attack identifying relationships between the subset of the pairs of the compute resources and the storage resources.

* * * * *